United States Patent
Des Jardins et al.

(10) Patent No.: US 10,418,026 B2
(45) Date of Patent: Sep. 17, 2019

(54) DYNAMIC LANGUAGE AND COMMAND RECOGNITION

(71) Applicant: Comcast Cable Communications, LLC, Philadelphia, PA (US)

(72) Inventors: George Thomas Des Jardins, Washington, DC (US); Vikrant Sagar, Silver Springs, MD (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/211,328

(22) Filed: Jul. 15, 2016

(65) Prior Publication Data

US 2018/0018959 A1    Jan. 18, 2018

(51) Int. Cl.
| | |
|---|---|
| *G10L 15/00* | (2013.01) |
| *G10L 15/08* | (2006.01) |
| *G10L 15/183* | (2013.01) |
| *G10L 15/22* | (2006.01) |
| *G10L 15/24* | (2013.01) |
| *G10L 15/32* | (2013.01) |

(52) U.S. Cl.
CPC ............ *G10L 15/005* (2013.01); *G10L 15/08* (2013.01); *G10L 15/183* (2013.01); *G10L 15/22* (2013.01); *G10L 15/24* (2013.01); *G10L 15/32* (2013.01); *G10L 2015/088* (2013.01); *G10L 2015/223* (2013.01)

(58) Field of Classification Search
CPC ............................ G10L 15/005; G10L 15/22; G10L 2015/223; G10L 2015/226; G10L 2015/228
USPC ......................................... 704/231, 243, 275
See application file for complete search history.

(56) References Cited

U.S. PATENT DOCUMENTS

| | | | | |
|---|---|---|---|---|
| 5,774,859 | A * | 6/1998 | Houser | H04N 5/44543 348/E5.103 |
| 5,805,771 | A * | 9/1998 | Muthusamy | G10L 15/005 704/231 |
| 6,999,932 | B1 * | 2/2006 | Zhou | G06F 17/275 704/235 |
| 7,761,297 | B2 * | 7/2010 | Lee | G10L 15/005 704/10 |

(Continued)

OTHER PUBLICATIONS

Apr. 16, 2018—European Search Report—EP 17181543.4.

*Primary Examiner* — Shaun Roberts
(74) *Attorney, Agent, or Firm* — Banner & Witcoff, Ltd.

(57) ABSTRACT

Systems and methods are described for processing and interpreting audible commands spoken in one or more languages. Speech recognition systems disclosed herein may be used as a stand-alone speech recognition system or comprise a portion of another content consumption system. A requesting user may provide audio input (e.g., command data) to the speech recognition system via a computing device to request an entertainment system to perform one or more operational commands. The speech recognition system may analyze the audio input across a variety of linguistic models, and may parse the audio input to identify a plurality of phrases and corresponding action classifiers. In some embodiments, the speech recognition system may utilize the action classifiers and other information to determine the one or more identified phrases that appropriately match the desired intent and operational command associated with the user's spoken command.

21 Claims, 8 Drawing Sheets

(56) References Cited

U.S. PATENT DOCUMENTS

| | | | |
|---|---|---|---|
| 7,877,774 B1* | 1/2011 | Basso | G06F 17/3002 |
| | | | 725/115 |
| 8,484,025 B1* | 7/2013 | Moreno Mengibar | ................ |
| | | | G10L 15/063 |
| | | | 704/255 |
| 2005/0119897 A1* | 6/2005 | Bennett | G10L 15/005 |
| | | | 704/270.1 |
| 2005/0132420 A1* | 6/2005 | Howard | G06F 3/017 |
| | | | 725/135 |
| 2007/0150273 A1* | 6/2007 | Yamamoto | G10L 15/22 |
| | | | 704/231 |
| 2008/0162146 A1* | 7/2008 | Eckert | G10L 15/005 |
| | | | 704/275 |
| 2010/0131262 A1* | 5/2010 | Gruhn | G10L 15/187 |
| | | | 704/8 |
| 2013/0006621 A1* | 1/2013 | Cross, Jr. | 704/231 |
| 2013/0238336 A1 | 9/2013 | Sung et al. | |
| 2014/0272821 A1* | 9/2014 | Pitschel | G09B 19/06 |
| | | | 434/157 |
| 2015/0039299 A1* | 2/2015 | Weinstein | G10L 15/16 |
| | | | 704/202 |
| 2015/0161999 A1* | 6/2015 | Kalluri | G10L 15/22 |
| | | | 704/257 |
| 2015/0221305 A1* | 8/2015 | Sharifi | G10L 15/26 |
| | | | 704/235 |
| 2015/0309984 A1* | 10/2015 | Bradford | G06F 17/2863 |
| | | | 704/8 |
| 2015/0364129 A1* | 12/2015 | Gonzalez-Dominguez | ................ |
| | | | G10L 15/005 |
| | | | 704/251 |

* cited by examiner

DYNAMIC LANGUAGE AND COMMAND RECOGNITION

BACKGROUND

Typically, speech recognition systems are configured to process and interpret audio input in view of the language of the consumer population. Notably, many speech recognition systems are configured to process and interpret a single language, such as English. However, as a consumer population becomes more diverse, it may become more of a challenge for a single language based recognition system (e.g., English-based recognition system) to recognize and interpret audio commands from audiences that may speak multiple languages in the same command/request. Furthermore, attempts to use a speech recognition system trained for different languages (e.g., Spanish) may prove less successful and ineffective in a linguistic environment where multiple languages are comingled when spoken, such as a when a native Spanish speaker randomly interjects English words and phrases into their speech (i.e., Spanglish). Accordingly, there remains a need to improve speech recognition systems.

SUMMARY

The following summary is for illustrative purposes only, and is not intended to limit or constrain the detailed description. The following summary merely presents various described aspects in a simplified form as a prelude to the more detailed description provided below.

Features herein relate to a speech recognition system and method that may be used as a stand-alone speech recognition system or comprise a portion of another content consumption system. The speech recognition system may facilitate requesting users to navigate through and select content items available for consumption utilizing an input device (e.g., a remote control device, smart phone device, etc.) configured to process, interpret and/or execute spoken commands. The speech recognition system may interpret a spoken user command using a variety of linguistic models (e.g., an English-based model, a Spanish-based model), and may generate a transcript of the spoken command as interpreted by each linguistic model. The speech recognition system may extract and process a plurality of phrases from each transcript of the spoken command to determine known content entities in the base language of the corresponding linguistic model (e.g., identifying phrases corresponding to English content titles in the English-based acoustic transcript).

The speech recognition system may further process the plurality of phrases extracted from each transcript to determine known action/command entities in the base language of the corresponding linguistic model (e.g., identifying phrases corresponding to Spanish commands in the Spanish-based acoustic transcript). The speech recognition system may combine various words/phrases from the identified phrases to generate a plurality of match phrases representing potential operational commands. The speech recognition system may use heuristic rules, command patterns, and other information (e.g., content consumption history, currently broadcast programming content) to filter the plurality of match phrases. After filtering the match phrases, the speech recognition system may select an appropriate match phrase and transmit, to a computing device, an operational command corresponding to the selected match phrase.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
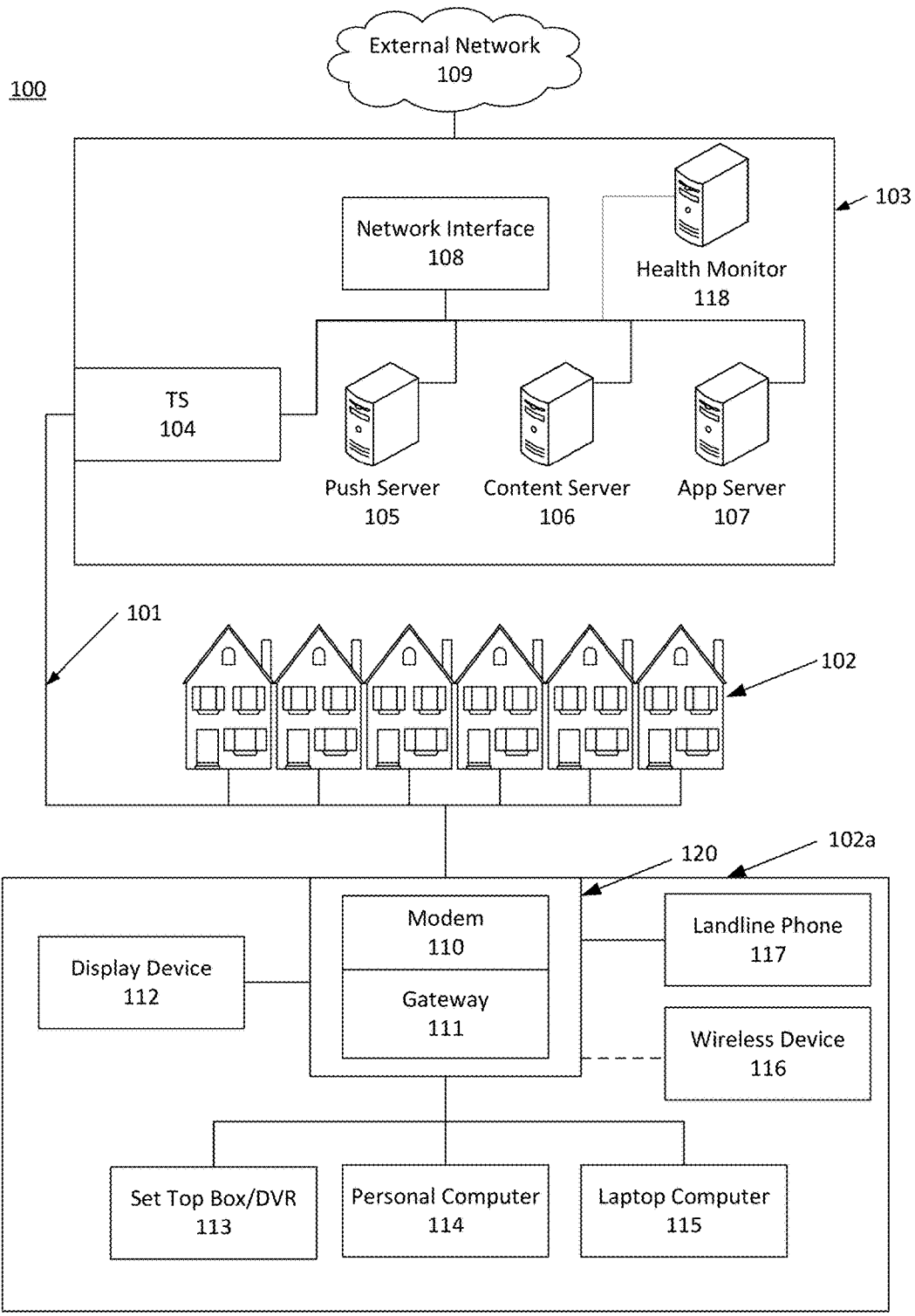
FIG. 1 shows an example communication network on which various features described herein may be used.

FIG. 1 shows an example communication network 100 on which many of the various features described herein may be implemented. The communication network 100 may be any type of information distribution network, such as satellite, telephone, cellular, wireless, etc. One example may be an optical fiber network, a coaxial cable network, or a hybrid fiber/coax distribution network. Such communication networks 100 use a series of interconnected communication links 101 (e.g., coaxial cables, optical fibers, wireless, etc.) to connect the various premises 102 (e.g., businesses, homes, consumer dwellings, etc.) to a local office or headend 103. The local office 103 may transmit downstream information signals onto the communication links 101, and each of the various premises 102 may have a receiver used to receive and process those signals.

There may be one communication link originating from the local office 103, and it may be split a number of times to distribute the signal to the various premises 102 in the vicinity (which may be many miles) of the local office 103. The communication links 101 may include components not illustrated, such as splitters, filters, amplifiers, etc. to help convey the signal clearly, but in general each split introduces a bit of signal degradation. Portions of the communication links 101 may also be implemented with fiber-optic cable, while other portions may be implemented with coaxial cable, other lines, or wireless communication paths.

The local office 103 may include an interface 104, such as a termination system (TS) interface 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of computing devices 105-107, such as servers, that may be configured to perform various functions. For example, the local office 103 may include a push notification computing device 105. The push notification device 105 may generate push notifications to deliver data and/or commands to the various premises 102 in the network (or more specifically, to the devices in the various premises 102 that are configured to detect such notifications). The local office 103 may also include a content server computing device 106. The content device 106 may be one or more computing devices that are configured to provide content to users at their premises. This content may be, for example, video on demand movies, television programs, songs, text listings, etc. The content server computing device 106 may include software to validate user identities and entitlements, to locate and retrieve requested content, to encrypt the content, and to initiate delivery (e.g., streaming) of the content to the requesting user(s) and/or device(s). Indeed, any of the hardware elements described herein may be implemented as software running on a computing device.

The local office 103 may also include one or more application server computing devices 107. The application server 107 may be a computing device configured to offer any desired service, and may run various languages and operating systems (e.g., servlets and JSP pages running on Tomcat/MySQL, OSX, BSD, Ubuntu, Red Hat, HTML5, JavaScript, AJAX and COMET). For example, an application server may be responsible for collecting television program listings information and generating a data download for electronic program guide listings. The application server may be responsible for monitoring user viewing habits and collecting that information for use in selecting advertisements. The application server may also be responsible for formatting and inserting advertisements in a video stream being transmitted to the various premises 102.

Although shown separately, one of ordinary skill in the art will appreciate that the push notification device 105, content server computing device 106, and the application server 107 may be combined. Further, here the push notification device 105, the content server computing device 106, and the application server 107 are shown generally, and it will be understood that they may each contain memory storing computer executable instructions to cause a processor to perform steps described herein and/or memory for storing data.

The example premise 102a, such as a home, may include an interface 120. The interface 120 may include any communication circuitry needed to allow a device to communicate on one or more communication links 101 with other devices in the network. For example, the interface 120 may include the modem 110, which may include transmitters and receivers used to communicate on the communication links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may be a set-top box (STB), digital video recorder (DVR), computer server, or any other desired computing device. The gateway interface device 111 may also include (not shown) local network interfaces to provide communication signals to requesting entities/devices in the premises 102a, such as the display devices 112 (e.g., televisions), STB and/or DVR 113, the personal computers 114, the laptop computers 115, the wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), the landline phones 117 (e.g. Voice over Internet Protocol—VoIP phones), the tablet computing devices 118, the mobile phones 119, and any other desired devices. Examples of the local network interfaces include Multimedia over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
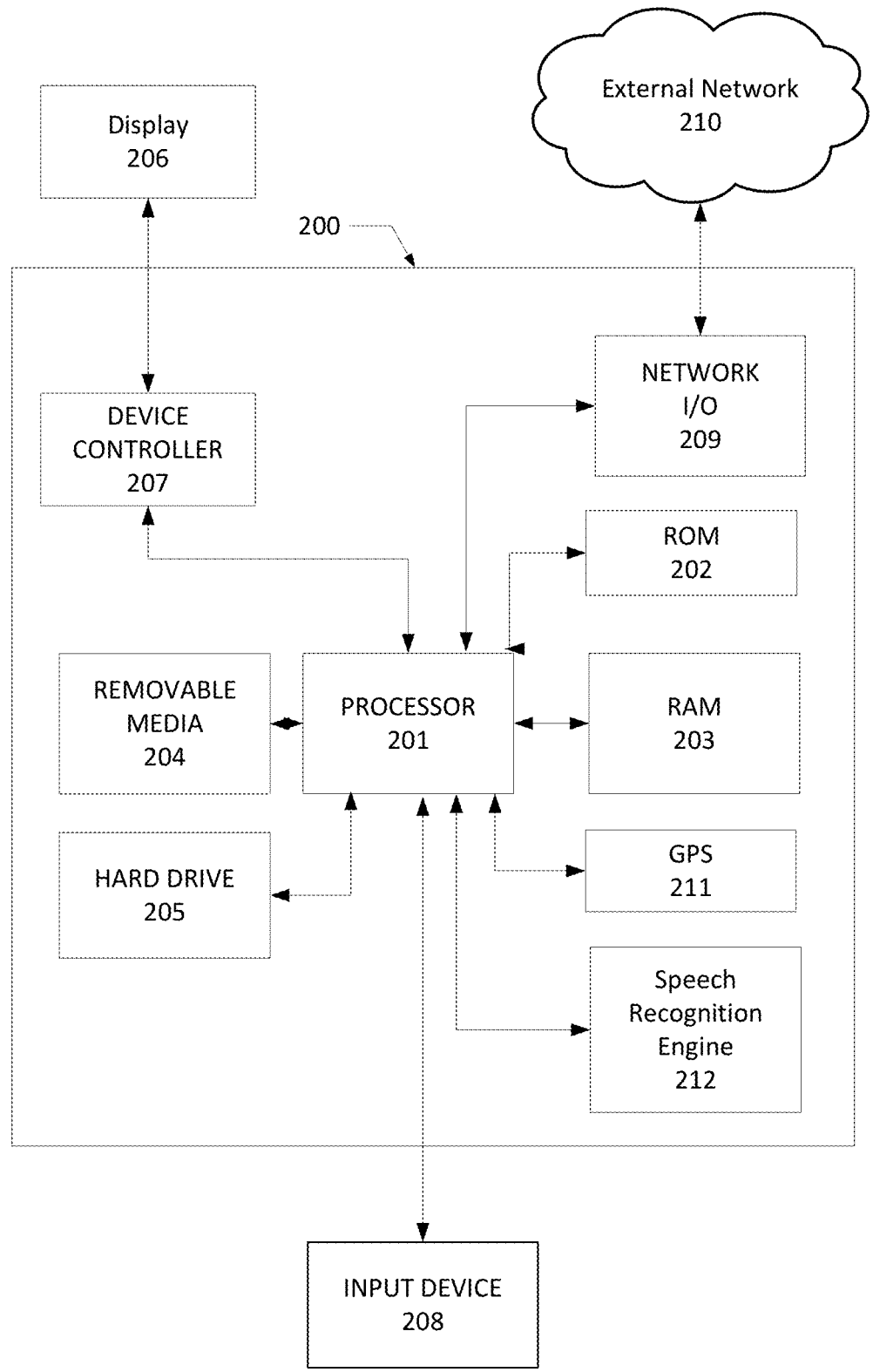
FIG. 2 shows an example computing device that can be used to implement any of the methods, servers, entities, and computing devices described herein.

FIG. 2 shows general hardware elements that may be used to implement any of the various computing devices discussed herein. The computing device 200 may include one or more processors 201, which may execute instructions to perform any of the features described herein. The instructions may be stored in any type of computer-readable medium or memory, to configure the operation of the processor 201. For example, instructions may be stored in a read-only memory (ROM) 202, the random access memory (RAM) 203, the removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may also include a security processor (not shown), which may execute instructions of a one or more computer programs to monitor the processes executing on the processor 201 and any process that requests access to any hardware and/or software components of the computing device 200 (e.g., ROM 202, RAM 203, the removable media 204, the hard drive 205, the device controller 207, a network circuit 209, the GPS 211, etc.). The computing device 200 may include one or more output devices, such as the display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as the network circuit 209 (e.g., a network card) to communicate with an external network 210. The network circuit 209 may be a wired interface, wireless interface, or a combination of the two. In some embodiments, the network circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which may be configured to receive and process global positioning signals and determine, with possible assistance from an external server and antenna, a geographic position of the device.

Further, the computing device 200 may include an audio or speech recognition system, such as the speech recognition engine 212, which can be configured to receive and process audio data captured by an audio capturing device. In some embodiments, the audio capturing device may be housed within and/or operatively connected to a user input device (e.g., the user input device 208) or other computing device capable of receiving and processing command data. The speech recognition engine 212 may be operatively connected to and/or in communication with a remote server or computer device. The remote server or computing device may be utilized to process the entire or some portion of the command data provided by the user.

The example in FIG. 2 is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, speech recognition engine 212, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity may be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein. The various computing devices, servers and hardware described herein may be implemented using software running on another computing device.

Figure 3A:
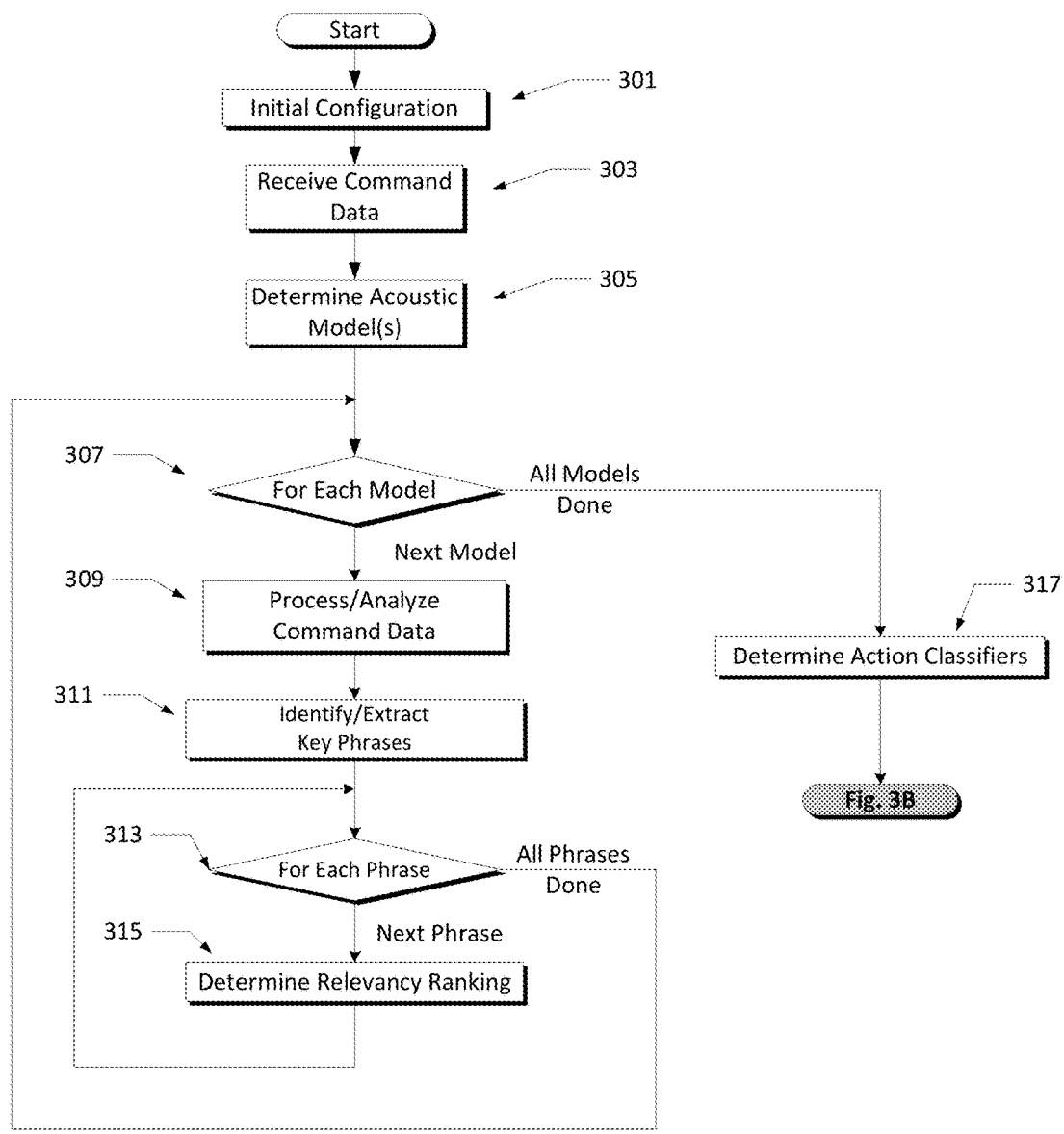
FIGS. 3A and 3B are exemplary flow diagrams of a method in accordance with one or more embodiments of the disclosure.
Figure 3B:
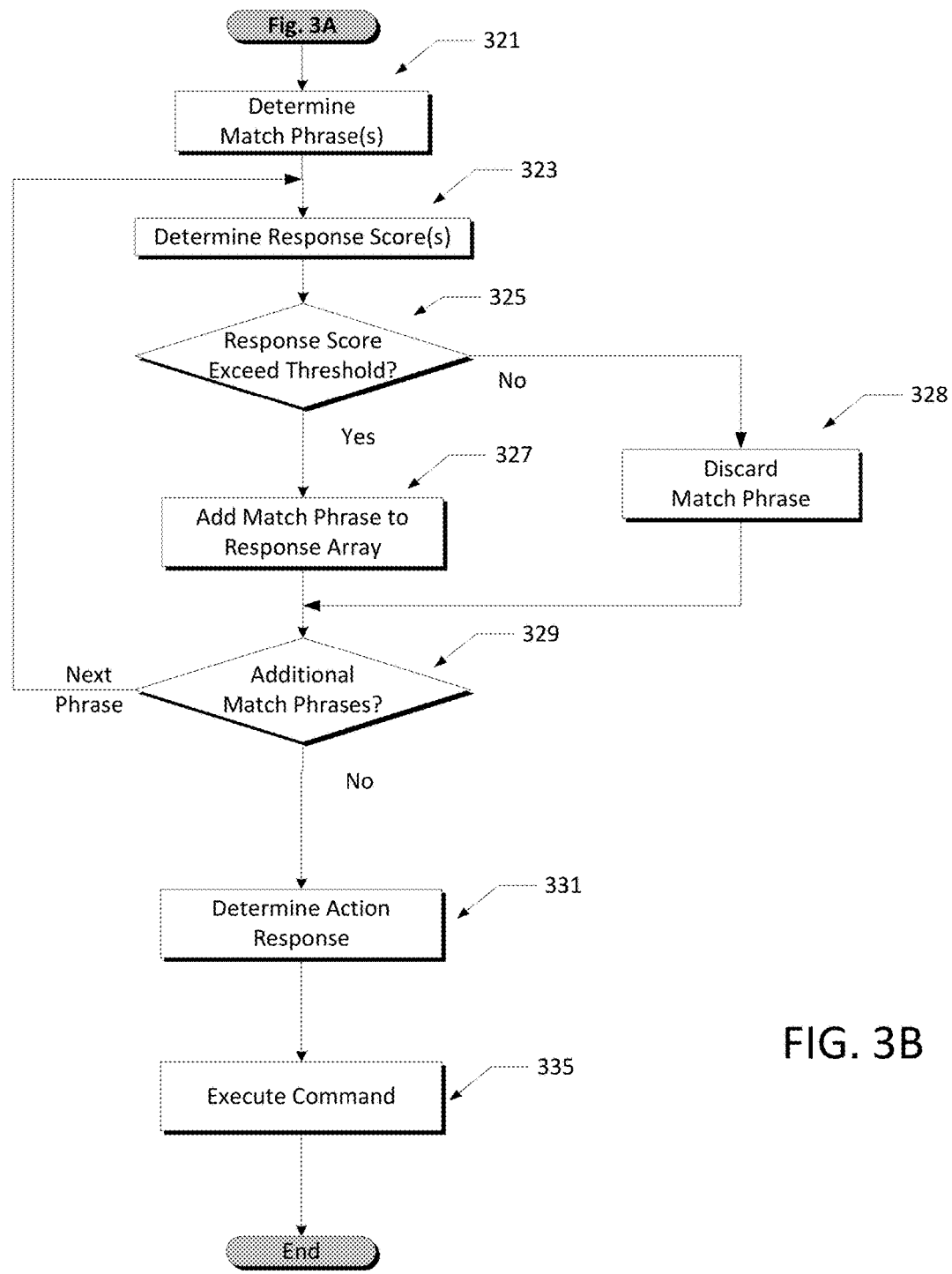

As noted above, features herein relate generally to a speech recognition system for interpreting multiple languages comingled within a spoken command. FIGS. 3A and 3B show an example method of processing command data. The example method may be performed by any computing device, for example the computing device 200, the application server 107, etc. In the example depicted in FIGS. 3A and 3B, a user may be consuming content on a television (e.g., the display device 112 via the gateway interface device 111) or via the STB/DVR 113, and may receive content and/or other information from servers 105-107, or another suitable computing device. Additionally, a user may utilize an input device (e.g., the input device 208) to provide control input, audio input (e.g., audible commands) and/or other commands to the computing device 200. In some embodiments, input device 208 may be equipped with a microphone (or any other suitable audio capturing device) to detect and capture spoke or command data. In some embodiments, the microphone or other suitable audio capturing device may be mounted on and/or operatively connected to a transmitter for converting a user's audible or voice command into an electronic voice signal (e.g., command data). Additionally or alternatively, the system may further comprise a recognition circuit for generating a control signal corresponding to a voice pattern represented by the electronic voice signal generated by the transmitter. Accordingly, the generated control signal may be transmitted to a receiver and/or any other suitable computing device (e.g., the computing device 200).

When describing the steps of the method below, the term "system" may be used when referring to each component, either singularly or collectively, employed at each step of the method. Such usage is merely for ease in discussing the method, and should not be interpreted as limiting the exact embodiment in which the following method may be performed.

The speech recognition system described herein may be configured to process spoken commands using a variety of linguistic models in parallel. For each linguistic model (e.g., acoustic model) used to interpret the command data, the system may generate a resulting acoustic transcript, and may parse the transcript to identify a plurality of phrases comprising the user's spoken command. The system may dynamically modify/generate acoustic models and/or determiner other speech recognition enhancements based on user preferences, viewing habits, and/or other user feedback. As will be explained in more detail below, the system may generate and/or modify acoustic models for particular sub-populations of users based on user demographic information and/or location. Different acoustic models for particular sub-populations of speakers (and/or other languages) can be created to further enhance and increase the accuracy of the speech recognition system. For example, the system may generate and/or modify an acoustic model based on data and other feedback relating to a sub-population of users residing in a particular region. As another example, the system may generate and/or modify an acoustic model based on data and/or other feedback relating to a sub-population of users within an age group (e.g., users between the ages of 8-12). The system may dynamically adjust and/or select an acoustic model based on previous audible commands for a user. The system may be configured to select a first acoustic model for a user based on a number of previous queries (e.g., audible commands) provided by the user. The system may process the previous audible commands as well as any additional audible commands provided by the user using a plurality of other acoustic models to identify the acoustic model, and in some instances the acoustic transcription, which best corresponds to (e.g., matches) the user's spoken command.

The system may process the plurality of identified phrases for each acoustic transcript to identify action entities, content entities, and/or other types of phrase classifications (e.g., action classifiers). Furthermore, utilizing a variety of heuristic cues and rule databases, the system may identify and/or rank the phrases that match the intended commands and/or content items desired by the user. By processing command data across various acoustic models, the system may detect words/phrases within an audible command that are spoken in different languages by the user. As will be explained in more detail below, the system may access a dictionary (or database) of words corresponding to an acoustic model when processing the command data to generate an acoustic transcript. In some instances, the system may detect a word or phrase that is not found within an acoustic model recognized by the system. In such instances, the system may attempt to identify one or more phrases that best corresponds to the command spoken by the user.

Referring to FIG. 3A, at step 301, an initial configuration of the system may be performed. This initial configuration may include a variety of actions. For example, a speech recognition application may be installed onto the user's computing device, such as the user's STB/DVR, or may be installed onto a suitable computing device operatively connected to a display device (e.g., the display device 112). In some embodiments, the speech recognition application may be a component of an electronic program guide executed on the user's computing device and/or provided by content service. The speech recognition application may provide an application interface and/or a series of program menus that permit the user to establish audio command guidelines and/or preferences for controlling the STB/DVR 113, the display device 112, or other controllable devices in the user's premises (e.g., the premises 102*a*).

In some embodiments, the user may be prompted to calibrate an input device (e.g., input device 208) or any other device configured to provide control input to a controllable device. For example, in some embodiments, the wireless device/smartphones 116 may be programmed and/or adapted to provide control input to the STB/DVR 113, the display device 112, and/or any other controllable devices in the user's premises. In these embodiments, the user may be prompted to pair the input device and/or wireless device with a controllable device residing in the user's premises (e.g., the STB/DVR 113, the display device 112, etc.). In some embodiments, during step 301, the speech recognition system may initiate a training sequence to calibrate an audio capturing component of the input device and/or wireless device. In such embodiments, the system may provide the user with a transcript of words, commands, phrases, etc., and may prompt the user to speak one or more of the phrases/words into the input device in furtherance of calibrating the speech recognition application. In some embodiments, the system may utilize command data obtained during a training sequence to generate and/or modify acoustic models utilized by the system. Additionally, or alternatively, the user may be prompted to say a plurality of audio commands such that the speech recognition application can process and analyze the user's speech pattern and other audio characteristics to more accurately interpret the user's voice and identify appropriate acoustic models for the user. The system may utilize various acoustic (or linguistic) models to interpret spoken user commands. For example, as will be explained in more detail below, the system may utilize dictionary-like databases for one or more languages (e.g., English, Spanish, etc.), when attempting to recognize and interpret audible commands that are spoken partly in a first language and partly in a second language (e.g., "Spanglish").

The remote control device may have one or more sets of audible command and/or voice templates stored in memory. For example, during or after the manufacture of the remote control device, an entity may download a plurality of commands and/or voice templates to the remote control device. In this example, the remote control device may be configured to generate control signals representing spoken user commands, and compare the control signals to one or more voice templates to determine the particular words/phrases spoken by the user. Additionally or alternatively, the remote control device may communicate with one or more remote computing devices to request and/or obtain audible commands that may be recognized by the remote control device. Alternatively or additionally, the stored audible commands for the remote control device may be displayed by a display of the remote control device. In some embodiments, the remote control device may communicate with an application interface displayed on a display device (e.g., display of the remote control, PC, the display device 112, etc.) to permit a user to further configure and/or calibrate the remote control device. In such embodiments, stored audible commands of the remote control device may be displayed on the application interface via a suitable display device, and may further provide the user with one or more menu options for erasing, adding and/or modifying the commands recognized by the remote control device. In other such embodiments, it may also possible that the audible commands for the remote control device can be displayed or transferred to the display device.

The initial system configuration may also include establishing the requesting user's account with a content service (e.g., creating an account, with username and password or other security, to allow the user to consume content on devices such as the STB/DVR 113) which may be, for example, a service operated by the content server 106 that provides streaming video content to the requesting user's authorized devices. On the topic of authorized devices, the initial configuration may also entail registering the STB/DVR 113, the computers 114/115, the wireless devices/smartphones 116, the input device 208, and any other device at the user's premises. This device registration may include providing the content server 106 with address information for the devices (e.g., a physical address, media access control (MAC) address, etc.), information identifying the device's capabilities (e.g., types of user interaction inputs/outputs available, memory size, processor type, form factor, display size and resolution, number of speakers, etc.).

During step 301, the system may populate a database (e.g., language database) of words/phrases for the various languages recognized by the system. The database may serve as a multi-lingual dictionary storing various phrases and/or commands that may be spoken by a user and recognized by the system. For example, as will be explained in more detail below, the system may include a processor for executing a speech recognition and/or natural processing algorithm to recognize audible commands detected by the remote control device (or other suitable audio capturing device). As noted above, the language database may include a database of voice templates corresponding to voice signatures for one or more words/phrases in the database. The system may operatively communicate with a network or Internet-based database to retrieve voice templates and/or audible commands. Additionally or alternatively, in some embodiments, the database may also store a plurality of acoustic (or linguistic) models associated with a language (e.g., English, Spanish, etc.) corresponding to the database. The voice templates corresponding to voice signatures for various phrases may be stored in a separate database from the plurality of acoustic models utilized to interpret command data. The system may utilize acoustic models stored in a first database to search and/or retrieve particular phrases and/or voice templates stored in a second database when analyzing and interpreting spoken user commands.

In step 303, the system may receive command data (e.g., audio input) from a first input device. During step 303, the user may provide an audible command to an input device, such as the input device 208, the wireless device 116, and/or any other computing device configured to receive and process audible commands from a user. In some embodiments, to initiate a recording of a spoken command, the user may first actuate a button on the input device. In other examples, the user may actuate a first designated area of an on-screen application interface (e.g., a record icon) to initiate recording of the audible command. The speech recognition module may reside within the input device. In such embodiments, the command data may be processed and analyzed at the input device to determine the appropriate command and/or control information to transmit to a computing device. In other embodiments, the input device may process and transmit the received command data to another computing device, such as the device 200, for further processing by a speech recognition engine.

Figure 4:
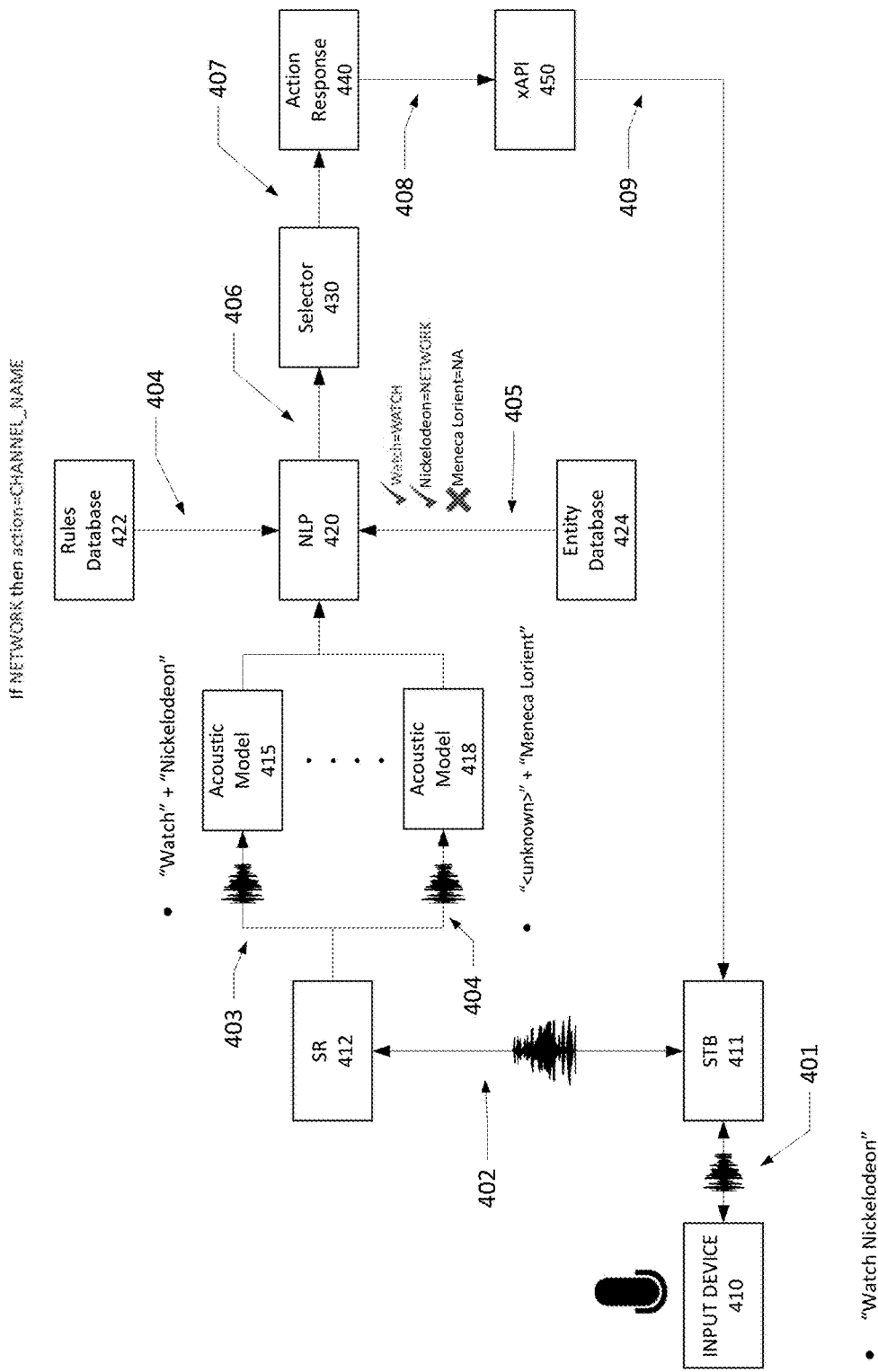
FIG. 4 shows an exemplary flow diagram and system architecture for processing multi-linguistic audio input according to one or more embodiments of the disclosure.

FIG. 4 shows an exemplary flow diagram and system architecture for processing multi-linguistic audio input. In the example embodiment depicted in FIG. 4, at least two language databases and corresponding acoustic models (e.g., English-based acoustic models and Spanish-based acoustic models) may be used to process a command spoken in English (i.e., a user saying "Watch Nickelodeon") captured at an input device. For example, referring to FIG. 4, the input device 410 is equipped with a microphone (or other audio capturing device) configured to receive and process audible command made by a user. At element 401, the input device may transmit command data corresponding to a spoken command (e.g., "Watch Nickelodeon") to the STB/DVR 411. The input device may be configured to transmit command data to a remote server for processing. The STB/DVR may access and/or request the command data captured by the input device 410 from the remote server. After receiving the command data, as shown by element 402, the STB/DVR 411 may transmit the command data to speech recognition module 412 for further processing. As noted above, a speech recognition module (e.g., the speech recognition module 412, the speech recognition engine 212, etc.) may be executed at a computing device, such as the computing device 200 to process and/or interpret command data received from the ST STB/DVR B 411.

The speech recognition module may be configured to process command data and generate some form of output data. The speech recognition module may process a plurality of voice templates to determine the particular words being spoken by the user. In some instances, the speech recognition module may be unable to ascertain voice templates that best corresponds to the spoken user commands, and may attempt to find the words/phrases that appropriately match the command data representing the user's spoken command. In some embodiments, the speech recognition module may configured to identify and output the words/phrases that appropriately match the command data notwithstanding how poorly an identified word/phrase actually matches the analyzed command data.

Figure 5:
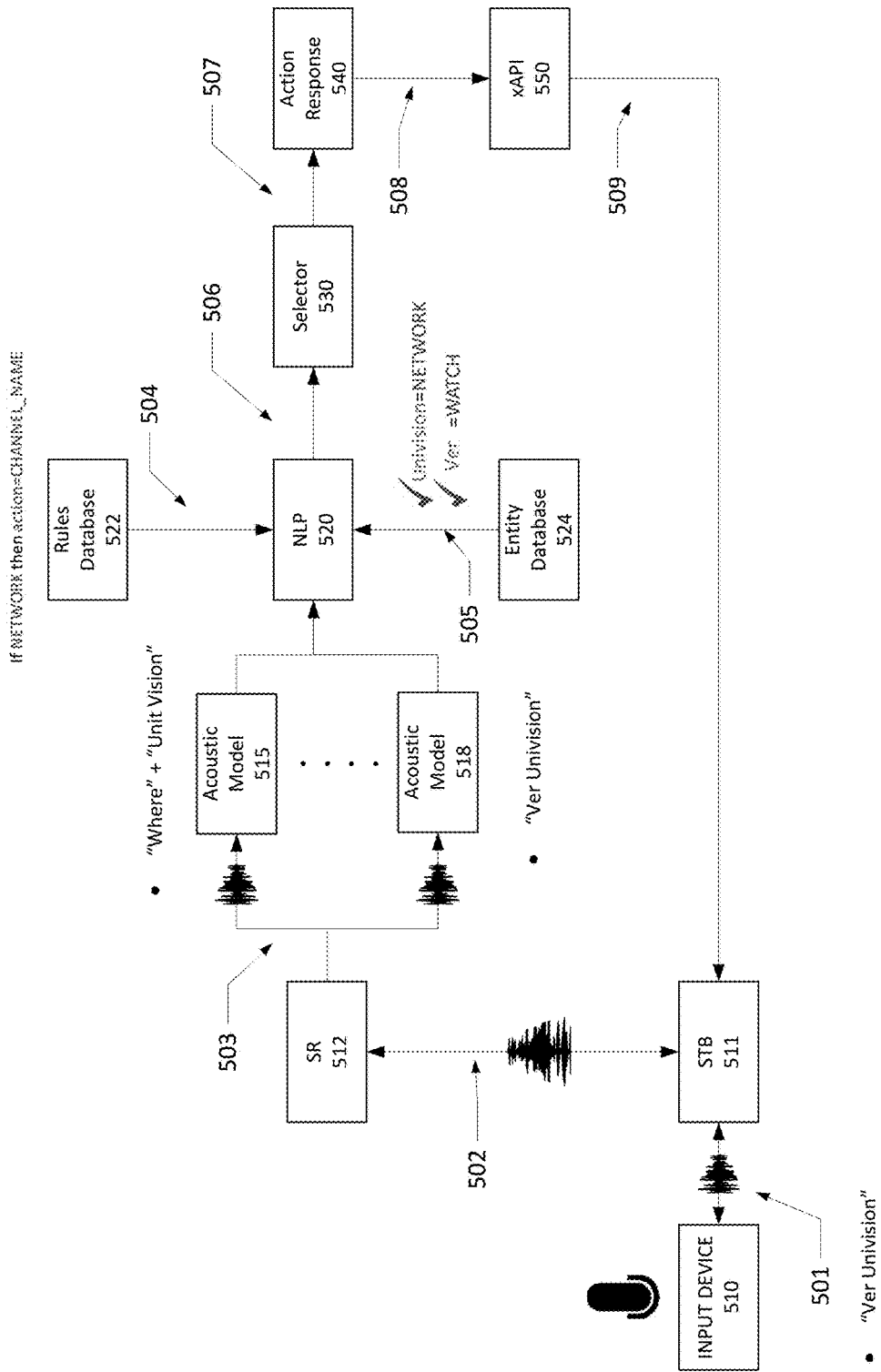
FIG. 5 shows an exemplary flow diagram and system architecture for processing multi-linguistic audio input according to one or more embodiments of the disclosure.

FIG. 5 shows an exemplary flow diagram and system architecture for processing multi-linguistic audio input. In the example embodiment depicted in FIG. 5, at least two language databases and corresponding acoustic models (e.g., English-based acoustic models and Spanish-based acoustic models) may be used to process a command spoken in Spanish (i.e., a user saying "Ver Univision") captured at an input device. At element 501, the input device may transmit to the STB/DVR 511 command data corresponding to a spoken command (e.g., "Ver Univision"). After receiving the command data, as shown by element 502, the STB/DVR 511 may transmit the command data to the speech recognition module 512 for further processing.

Figure 6:
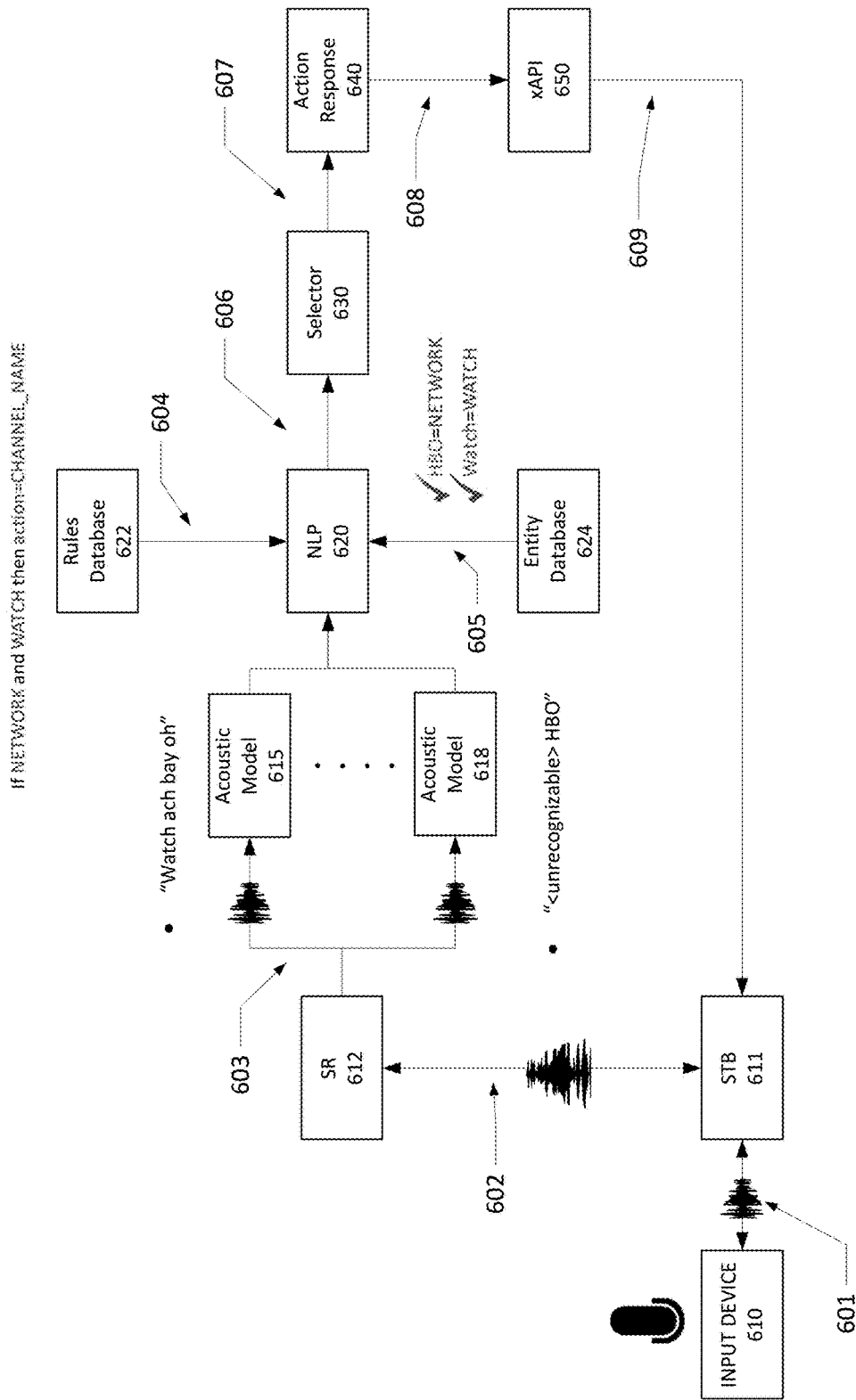
FIG. 6 shows an exemplary flow diagram and system architecture for processing multi-linguistic audio input according to one or more embodiments of the disclosure.

Similarly, FIG. 6 shows an exemplary flow diagram and system architecture for processing multi-linguistic audio input. In the example embodiment depicted in FIG. 6, at least two language databases and corresponding acoustic models (e.g., English-based acoustic models and Spanish-based acoustic models) may be used to process a command spoken partly in English (i.e., a user saying "Watch") and partly in Spanish (i.e., the user pronouncing the acronym HBO in Spanish—"Ach Bay Oh") captured at an input device. At element 601, the input device may transmit command data corresponding to a spoken command (e.g., "Watch+Ach Bay Oh") to the STB/DVR 611. After receiving the command data, as shown by element 602, the STB/DVR 611 may transmit the command data to the speech recognition module 612 for further processing.

Referring back to FIG. 3A, at step 305, the system may determine one or more acoustic models to be utilized by a speech recognition engine. The system may prompt the user to identify one or more acoustic models that may be utilized to interpret audible commands provided to the input device. The system may instruct a display device to display to the user a listing of different acoustic models, and may prompt the user to select one or more models from the list. For example, a speech recognition application may instruct a display device to display a plurality of different languages for a user to select from. As will be explained in more detail below with reference to FIGS. 4 and 7, in some embodiments, the system may utilize a natural language processor, either alone or in combination with a speech recognition engine module, to process and interpret command data. In some of these embodiments, a natural language processor may be configured to identify the one or more acoustic models utilized by the system to interpret command data. Additionally or alternatively, the system may identify one or more language databases that may be utilized to interpret audible commands provided to an input device. In such embodiments, the system may retrieve one or more acoustic models associated with (and/or stored at) a particular language database. For example, a speech recognition module may retrieve (or request) English-based acoustic models from an English-based language database.

In some instances, the system may automatically identify an acoustic model to be utilized by the speech recognition system based on a various types of information without departing from the scope of the present disclosure, such as user profile, the user's content preferences, the user's viewing habits, and other suitable user information. The system may identify an acoustic model based on the user's account profile and/or content preferences. The system may also identify a language database from which to retrieve an acoustic model based on the user's account profile and/or preferences For example, the system may automatically identify a Spanish-based language database and retrieve corresponding Spanish-based acoustic models when the system determines that the user has activated a Spanish secondary audio stream ("SAP") feature on the STB/DVR 411 or an operatively connected display device (e.g., the display device 112). As another example, the system may automatically identify an acoustic model to be utilized by the speech recognition system based on a language selected to be displayed to the user via a programming content interface (e.g., electronic program guide). For example, the system may select an acoustic (or linguistic) model to interpret command data based on the gender of the user. In this example, the system may select from a first set of linguistic models associated with the gender of the user.

In other embodiments, the system may be configured to automatically select an acoustic model for a user based on the user's audio fingerprint. Over time, the system may receive, process, and store previous audible commands of the user. The system may be configured to utilize the previous audible commands of the user to identify certain audible characteristics and/or parameters unique to the user. In some of these embodiments, the system may analyze the user's audible command, and may extract a portion or segment of the audible command (e.g., audio fingerprint) for further processing. In some instances, the system may compare characteristics of an extracted portion of the audible command with audio characteristics of a stored audio sample to confirm the identity of the user. In other instances, the system may select an acoustic model based on a comparison of audio characteristics in an extracted portion of the audible command and audio characteristics of stored audio samples and/or acoustic models.

The system may identify an acoustic model for a user based on a time of day and/or the particular day that the audible command is provided by the user. The system may analyze a stored content consumption history for a plurality of viewers to anticipate which viewer is providing the audible command. For example, if the system receives an audible command at 11:00 pm, the system may analyze a content consumption history for the one or more viewers associated with the account to determine which users (if any) have previously consumed content and/or provided an audible command during that time period. In this example, younger users (e.g., children) may not typically be awake during this time period, as evidenced by the stored content consumption history indicating that programming content for children has not been consumed after a certain time period, or that a younger user on the account has not provided an audible command requesting content after a certain time period. As such, the system may be configured to exclude certain users (e.g., younger users) when attempting to identify a user that provided the audible command. According, the system may utilize the stored content consumption history to identify which user provided the audible command, and further, to select the appropriate acoustic model for that user.

In another embodiment, the system may select a linguistic model based on a geographic location of the user. The system may select from a first set of linguistic models associated with the zip code, city, state and/or geographic region of the user providing the command data. For example, when selecting linguistic models to interpret command data provided by a user living Boston, the system may emphasize (and/or prioritize) linguistic models associated with users having a Boston or New England regional accent. As another example, when selecting linguistic models to interpret command data provided by a user living South Carolina, the system may emphasize (and/or prioritize) linguistic models associated with users having a Southern accent. Additionally or alternatively, the system may select a linguistic model based on a language preference and/or other characteristics of the user. For example, if the user is a native-English speaker, when selecting linguistic models to interpret command data provided by the user, the system may select from a first language database and/or set of linguistic models associated with native-English speaking users.

As another example, if the user is a native-Spanish speaker, when selecting linguistic models to interpret command data provided by the user, the system may select from a first language database and/or set of linguistic models associated with native-Spanish speaking users. The proper acoustic model(s) to be utilized by the system may be identified in a variety of manners based on the user characteristics, demographics, and profile/account information as discussed above. For example, when determining that a user utilizes both Spanish and English words/phrases within their spoken commands and/or operation of the STB/DVR, the system may utilize acoustic models associated with both a native-Spanish speaker and a native-English speaker to interpret the user's spoken commands. Accordingly, such acoustic models may be utilized by the system if the user was accustomed to using Spanglish when providing spoken commands.

In other embodiments, the speech recognition system may use a native-Spanish acoustic model and a second acoustic model corresponding to a native-Spanish speaker speaking English to interpret the user's commands. Various types and/or combinations of acoustic models may be used to best analyze and interpret spoken user commands without departing from the scope of the present disclosure. Referring to the example above, the acoustic model corresponding to a native-Spanish speaker speaking English may be utilized to supplement and/or replace native-English acoustic models to more accurately recognize and interpret user commands that are spoken in Spanglish. As another example, for users that speak Spanglish and live in Texas, the system may utilize acoustic models associated with native-Spanish speakers, native-English speakers and/or native-English speakers with Southern or Texan accents to interpret the user's spoken commands. As discussed above, over time, the system may calibrate which acoustic models are utilized to interpret a user's spoken commands. Additionally or alternatively, as part of the calibration process, the user may be provided with various menus and/or options (via an application interface) to facilitate the calibration process, and further to provide additional information such that the system may select the most appropriate acoustic models.

Referring back to FIG. 4, the speech recognition module 412 may identify one or more acoustic models to be utilized for processing and/or interpreting command data. In the example embodiment depicted in FIG. 4, the system may utilize at least a first linguistic (or acoustic) model associated with native-English speaking users (e.g., the acoustic model 415) to interpret the audible command received at the STB/DVR 411 (see element 401), and may further utilize a second linguistic model associated with native-Spanish speaking users (e.g., the acoustic model 418) to interpret the audible command. The speech recognition application may prompt the user to confirm an automatically identified linguistic model for processing the command data.

A content provider may utilize third-party vendors or services to create/implement the speech recognition technology and/or software used in conjunction with the user's entertainment system. In such instances, the underlying content provider may not have authorization to adjust or modify the initial calibration system or other aspects of the speech recognition system. Accordingly, the content provider may utilize a natural language processor and/or other suitable computing device to process output provided from a third-party speech recognition system to modify or calibrate certain aspects of the speech recognition system.

As noted above, in some embodiments, the system may utilize a natural language processor (e.g., the NLP 420) to analyze the command data. The natural language processor may utilize user profile/account information, viewing habits, content consumption history, and other information to identify the appropriate acoustic models for processing command data. The natural language processor may utilize command data provided as output from a speech recognition module to identify the appropriate acoustic models. As shown in FIG. 4, the NLP 420 may receive and process output (e.g., command data) from the speech recognition module 412. Additionally or alternatively, the NLP 420 may process output from the speech recognition module 412 to determine one or more acoustic models to be utilized for interpreting the command data. In still other examples, the natural language processor may utilize command data received from an external computing device to identify the appropriate acoustic models for interpreting spoken user commands.

The NLP 420 may be programmed and adapted to execute a speech recognition and/or natural language processing algorithm to analyze command data. The natural language processing algorithm may be utilized by the NLP 420 to generate valid hypotheses as to what actions a user desires the entertainment system to implement based on the user's spoken commands. The natural language processing algorithm may be configured to identify, sort, and/or rank the various possible commands and actions that may be implemented by the entertainment system (and/or other operatively connected computing devices) based on the user's spoken command. As will be explained in more detail below with respect to FIG. 7, when executing the natural language processing algorithm, the NLP 420 may receive (or request) one or more linguistic transcriptions of the user's spoken commands in a variety of languages, and may further attempt to recognize and parse keywords and phrases from each received transcription. The detected keywords may comprise action entities, content entities, or other types of phrase classification or action classifiers.

When recognizing keywords for multiple languages, the natural language processing algorithm may use a variety of heuristic rules and/or other information to rank the most appropriate phrases (and/or corresponding language). The natural language processing algorithm may use these rules to select the top entities and/or phrases that match a user's intent based on context. For example, if the natural language processing algorithm detects the word "Watch" in English (or similarly the word "Ver" in Spanish) the system may categorize this term as a first type of action classifier (e.g., an action entity), and may then search for a second type of action classifier (e.g., content entities) in one or more remaining portions of the acoustic transcript corresponding to the user's spoken command. As another example, if the natural language processing algorithm detects the word "Watch" in English (or similarly the word "Ver" in Spanish) the system may categorize this term as a first type of action classifier (e.g., an action entity), and may then assign a second type of action classifier (e.g., content entities) to the one or more remaining portions of the acoustic transcript corresponding to the user's spoken command. In the examples above, if the natural language processing algorithm determines that the name of a sports team is also included in the transcript, the natural language processing algorithm may infer that the user intends to watch a sporting match that features the identified sports team. As another example, if the natural language processing algorithm detects the word "Watch" and the name of a content title (e.g., a TV program, movie, etc.) are included in the transcript, the natural language processing algorithm may infer that the user intends to watch the content title and/or for the entertainment system to begin playing the identified content title.

As noted above, the natural language processing algorithm may generate multiple hypotheses based on the detected keywords, heuristic rules, and/or the inferred intent of the user. For example, as will be explained in more detail below, in view of certain heuristic rules utilized by the system, such as the availability of programming content (e.g., content items) and/or the type of acoustic model used to interpret the command data, the natural language processing algorithm may discard, promote, and/or deemphasize each possible hypotheses generated by the natural language processing algorithm. As will be explained din more detail below, one or more of the hypotheses generated by the natural language processing algorithm may be transmitted to a display device to be viewed by the user. The system may receive user input selections indicating a most appropriate hypothesis in view of the user's actual intent. The system may be configured to store the user's selections, and over time, the system may utilize user feedback to calibrate the natural language processing algorithm and/or acoustic models used to interpret command data.

Referring back to FIG. 3A, at step 307, the system may begin a loop that is performed for one or more of the acoustic models identified in step 305. In one embodiment, a speech recognition module (such as the speech recognition engine 212), may be configured to begin a loop that is performed for one or more of the acoustic models identified in step 305. Additionally or alternatively, a computing device executing the speech recognition application may be configured to begin a loop that is performed for one or more of the monitored devices identified in step 305. In step 309, for each acoustic model analyzed within the loop, the system (and/or speech recognition engine) may process and analyze the command data received during step 303. For example, as shown in FIG. 4, the system may receive an audible command from the user to "Watch Nickelodeon," (e.g., element 401), and as shown by element 403, the system may utilize the acoustic model 415 to analyze the command data to identify and/or extract each phrase comprising the spoken user command in accordance with a linguistic context of the acoustic model 415 (e.g., an acoustic model for native-English speakers).

The NLP 420 may process command data received from the speech recognition module 412 to identify variety of linguistic characteristics associated with the command data. For example, the NLP 420 may process the command data to determine whether the user providing the spoken command comprising the command data speaks with a particular and/or regional accent. As another example, the NLP 420 may process command data to distinguish what language the user is speaking. Additionally, as noted above, the NLP 420 may utilize other data, such as user account information, user viewing habits, user demographic information, location information, and/or user content preferences, to identify the appropriate acoustic models for interpreting the command data. In other embodiments, the NLP 420 may utilize heuristic cues and/or other rules to identify acoustic models for interpreting the command data.

Additionally, referring to the example in FIG. 4, the system may utilize the acoustic models 415 and 418 to analyze and/or interpret command data provided by the speech recognition module in accordance with a linguistic context of the underlying acoustic model. In this example, the system may identify two acoustic models to interpret the command data. The first acoustic model (e.g., the acoustic model 415) may correspond to the English language and/or a sub-population of native-English speakers. The second acoustic model (e.g., the acoustic model 418) may correspond to the Spanish language and/or a sub-population of native-Spanish speakers. In this example, the system may receive an audible command from the user, i.e., "Watch Nickelodeon," (e.g., element 401), and as shown by element 403 and 404, the system may utilize the acoustic models 415 and 418 to analyze the command data.

Figure 7:
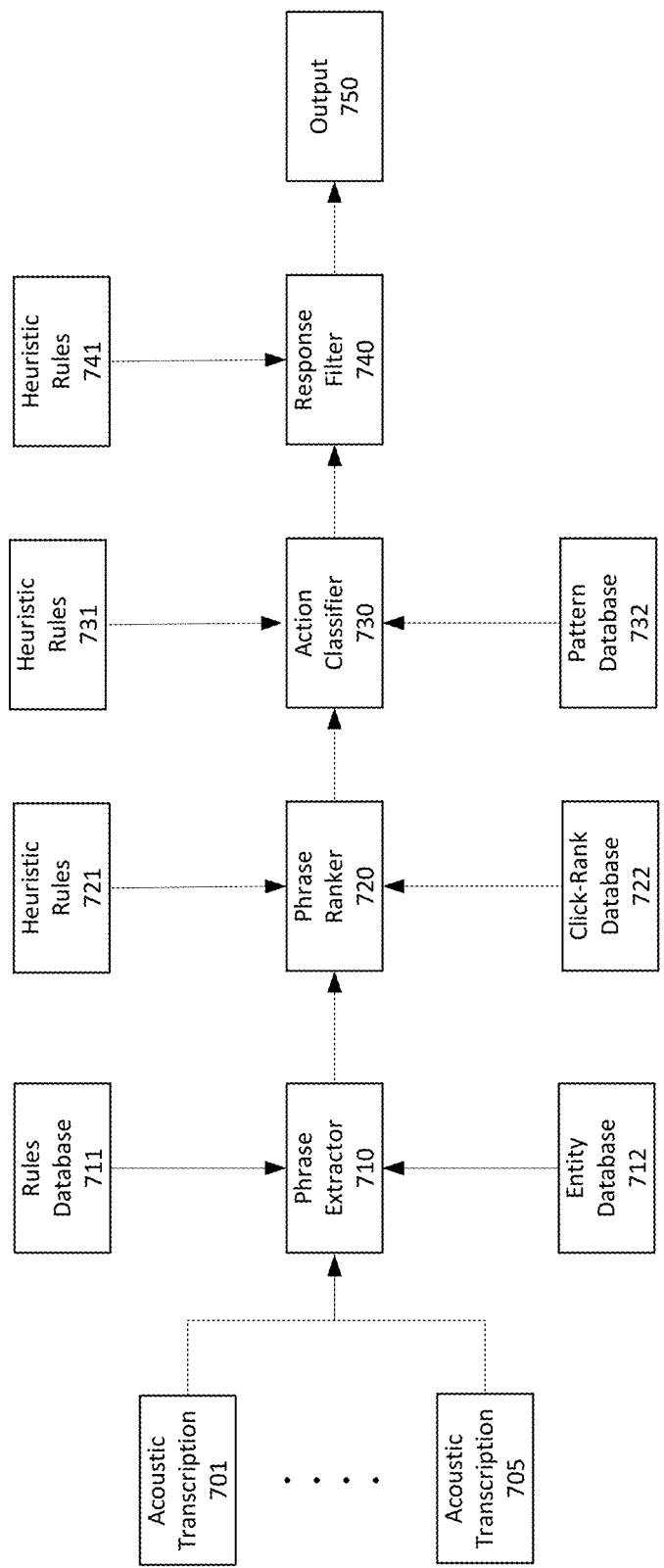
FIG. 7 shows an exemplary flow diagram and system architecture for a natural language processing system according to one or more embodiments of the disclosure.

In some embodiments, the NLP 420 may execute a natural language processing algorithm to analyze command data. FIG. 7 shows an exemplary flow diagram and system architecture for a natural language processing algorithm executed by a natural language processing module, for example the NLP 420. As will be explained in more detail below with respect to FIG. 7, the natural language processor may analyze the command data in view off heuristic rules and other information databases to identify which language is being spoken by the user and to determine the appropriate acoustic models to utilize when interpreting the command data. Referring back to FIG. 4, the natural language processing module may utilize acoustic models (e.g., the acoustic models 415 and 418) to process and/or interpret command data. As noted above, in some embodiments, SR 412 may process command data received from the STB/DVR 411 (or any other suitable computing device) to generate an acoustic transcript of the spoken command comprising the command data. The speech recognition module 412 may utilize an acoustic model to process the command data and to generate an acoustic transcript corresponding to the command data. Additionally or alternatively, the NLP 420 may receive from the speech recognition module 412 acoustic transcripts corresponding to each of the acoustic models utilized by the system to process the command data.

In still other embodiments, the NLP 420 may process command data received from the speech recognition module 412 (or any other suitable computing device) to generate an acoustic transcript of the spoken user command comprising the command data. The NLP 420 may utilize acoustic models to interpret command data, and may further generate an acoustic transcript of the command data for one or more of the acoustic models used to analyze the command data. Referring to the examples in FIGS. 4 and 7, the NLP 420 may interpret command data utilizing a first acoustic model (e.g., acoustic model 415) to generate an acoustic transcript (e.g., the acoustic transcript 701). In this example, the NLP 420 may interpret command data corresponding to the spoken user command (e.g., "Watch Nickelodeon") utilizing an acoustic model for native-English speakers (e.g., the acoustic model 415) to generate a transcript in English of the user's command. Additionally or alternatively, the NLP 420 may utilize an English language database and/or a corresponding database of English-based voice templates to analyze the spoken command data. The NLP 420 may compare the command data (e.g., electronic signals representing the spoken command "Watch Nickelodeon") to one or more voice templates to identify the various words or phrases being spoken by the user. Accordingly, as shown in FIG. 4, the NLP 420 may determine that the acoustic transcript 701 comprises the phrases/words "Watch Nickelodeon."

Similarly, the NLP 420 may interpret the command data utilizing other acoustic models (e.g., the acoustic model 418) to generate additional acoustic transcripts (e.g., the acoustic transcript 705). In this example, the NLP 420 may interpret command data corresponding to the spoken user command (e.g., "Watch Nickelodeon") utilizing an acoustic model for native-Spanish speakers (e.g., the acoustic model 418) to generate a transcript in Spanish of the user's spoken command. The NLP 420 may utilize a Spanglish language database and/or a corresponding database of voice templates to analyze the command data. The NLP 420 may compare the command data (e.g., electronic signals representing the spoken command "Watch Nickelodeon") to one or more voice templates to identify the various words or phrases being spoken by the user in Spanish. In this instance, although the user's command were spoken in English, the NLP 420 may attempt to find the Spanish words/phrases corresponding to Spanish-based voice templates that appropriately match the analyzed command data. Accordingly, as shown in FIG. 4, the NLP 420 may determine that the acoustic transcript 705 comprises the phrases/words "<unknown>+Meneca Lorient."

Referring to the example embodiment in FIG. 5, the NLP 520 may interpret command data utilizing a first acoustic model (e.g., the acoustic model 515) to generate an acoustic transcript. In this example, the NLP 520 may interpret command data corresponding to the spoken user command (e.g., "Ver Univision") utilizing an acoustic model for native-English speakers (e.g., the acoustic model 515) to generate a transcript in English of the user's spoken command. Additionally or alternatively, the NLP 520 may utilize an English language database and/or a corresponding database of English-based voice templates to analyze the spoken command data. The NLP 520 may compare the command data (e.g., electronic signals representing the spoken command "Ver Univision") to one or more voice templates to identify the various words or phrases being spoken by the user. Accordingly, as shown in FIG. 5, the NLP 520 may determine that a resulting acoustic transcript may comprises the phrases/words "Where" and "Unit Vision." In this example, the system identified that a first portion of the command data corresponding to the spoken command "Ver" appropriately matched an English-based voice template corresponding to the English word "Where." Similarly, the system identified that a second portion of the command data corresponding to the spoken command "Univision" appropriately matched an English-based voice template corresponding to the English words "Unit Vision."

In the example embodiment depicted in FIG. 5, the NLP 520 may interpret the command data utilizing other acoustic models (e.g., the acoustic model 518) to generate additional acoustic transcripts. In this example, the NLP 520 may interpret command data corresponding to the spoken user command (e.g., "Ver Univision") utilizing an acoustic model for native-Spanish speakers (e.g., the acoustic model 518) to generate a transcript in Spanish of the user's command. The NLP 520 may utilize a Spanglish language database and/or a corresponding database of voice templates to analyze the spoken command data. The NLP 520 may compare the command data (e.g., electronic signals representing the spoken command "Ver Univision") to one or more voice templates to identify the various words or phrases being spoken by the user in Spanish. In this example, as shown in FIG. 4, the NLP 420 may determine that a resulting acoustic transcript of the spoken command may comprise the phrases/words "Ver Univision."

Similarly, referring now to the example embodiment in FIG. 6, the NLP 620 may interpret command data utilizing a first acoustic model (e.g., the acoustic model 615) to generate an acoustic transcript. In this example, the NLP 620 may interpret command data corresponding to a user command spoken in Spanglish, where the user is attempting to watch the television network HBO. The system may first process the received command data utilizing an acoustic model for native-English speakers (e.g., the acoustic model 615) to generate a transcript in English of the user's spoken command. Additionally or alternatively, the NLP 620 may utilize an English language database and/or a corresponding database of English-based voice templates to analyze the command data. The NLP 620 may compare the command data (e.g., electronic signals representing the spoken command) to one or more voice templates to identify the various words/phrases being spoken by the user. Accordingly, as shown in FIG. 6, the NLP 620 may determine that a resulting acoustic transcript may comprise the phrases/words "Watch" and "Ach Bay Oh." In this example, the system identified that a first portion of the command data corresponding to the spoken command "Watch" appropriately matched an English-based voice template corresponding to the English word "Watch." Similarly, the system identified that a second portion of the audible command appropriately matched an English-based voice template corresponding to the English phonetic pronunciation of "Ach+Bay+Oh."

In the example embodiment depicted in FIG. 6, the NLP 520 may interpret the command data utilizing other acoustic models (e.g., the acoustic model 618) to generate additional acoustic transcripts. In this example, the NLP 620 may interpret command data corresponding to the spoken user command utilizing an acoustic model for native-Spanish speakers (e.g., the acoustic model 618) to generate a transcript in Spanish of the user's command. The NLP 620 may utilize a Spanglish language database and/or a corresponding database of voice templates to analyze the spoken command data. The NLP 620 may compare the command data (e.g., electronic signals representing the spoken command) to one or more voice templates to identify the various words or phrases being spoken by the user in Spanish. In this instance, although the user's command were spoken in Spanglish, the NLP 420 may attempt to find the Spanish words or phrases corresponding to Spanish-based voice templates that appropriately match the analyzed command data. Accordingly, as shown in FIG. 4, the NLP 420 may determine that a resulting acoustic transcript for a first portion of the command data is unrecognizable to the system. However, for a second portion of the command data the system may determine that a resulting acoustic transcript of the spoken command may comprises the phrase/word "HBO."

Referring back to FIG. 3A, at step 311, the system may identify and/or extract key phrases from the command data processed during step 309. The system may analyze the command data received during step 309 and may parse the received command data into a plurality of phrases. For example, the system may utilize a natural language processor (or other suitable language processing device) to analyze and/or parse each phrase of an acoustic transcript corresponding to the spoken user commands. Although the term "phrase" is used herein to describe a segment of the command data that may be identified/extracted from command data or an acoustic transcript by the system, a "phrase" may comprise one or more words. Alternatively or additionally, a phrase may comprise one or more words which can be part of an entity and/or context recognized by the entertainment system. Various known methods for analyzing command data to identify and/or parse phrases may be implemented in accordance with the embodiments disclosed herein.

As discussed above with reference to FIGS. 4 and 7, the system may utilize language databases and corresponding acoustic models to interpret command data and to generate acoustic transcripts of the a user's spoken commands. The system may utilize an acoustic model (e.g., the acoustic model 415) to analyze the command data to generate an acoustic transcript of the user's spoken command. The natural language processor may analyze the acoustic transcript to identify and/or extract each phrase comprising the spoken user command. For example, as shown in FIG. 7, the phrase extractor 710 may analyze acoustic transcript 701 to identify and/or extract each phrase comprising the spoken user command in accordance with a linguistic context of the acoustic model (e.g., the acoustic model 415) used to generate the transcript. Accordingly, the phrase extractor 710 may analyze the acoustic transcript 701 to identify and/or extract one or more English words/phrases from the transcript. In this example, the phrase extractor 710 may analyze a first portion of the acoustic transcript 701 corresponding to the spoken user command to identify an English phrase, which in this example would correspond to the word "Watch." Additionally, the phrase extractor 710 may analyze a remaining portion of the acoustic transcript 701 corresponding to the spoken user command to identify an appropriate English phrase, which in this example would correspond to the word "Nickelodeon."

Referring back to FIG. 4, the NLP 420 may utilize information from various input sources (e.g., the rules database 422, the entity database 424, etc.) to analyze and parse the one or more phrases comprising the command data. As discussed above, the NLP 420 may utilize a phrase extractor module (e.g., the phrase extractor 710) to analyze and parse each phrase of an acoustic transcript (e.g., the acoustic transcripts 701, 705) of the user's spoken commands. The phrase extractor 710 may utilize information from various input sources (e.g., the rules database 711, the entity database 712, etc.) to analyze and parse each of the acoustic transcripts. Additionally or alternatively, an entity database (e.g., the entity database 712) may store "synonyms" that may be utilized by the system to interpret acoustic transcripts and/or audible commands representing spoken user commands. For example, a synonym may refer to a word or phrase which maps to an entity and/or command phrase, but may be different or similar to the entity/phrase in a variety of ways without departing from the scope of the present disclosure. For example, a synonym may differ from an entity/phrase based on a spelling difference due to the selected linguistic model for interpreting the spoken command (e.g., "spider man"=>"spiderman"). As another example, a synonym may differ from an entity/phrase based on a spelling difference in view of the acoustic transcription process (e.g., "hairy potter"=>"harry potter"). As another example, a synonym may differ from an entity/phrase based on differences in content promotion versus content metadata supplied to the content provider via 3$^{rd}$-party data provider (e.g., "at midnight"=>"@midnight"). Still another example, a synonym may differ from an entity/phrase based on semantic similarities due to the natural language model utilized for the user and/or based on common sense equivalents for phrases utilized by the user (e.g., "watch"=>"tune to").

As discussed above, the synonyms stored in the entity database may be utilized by the system to overcome learned and/or common errors when interpreting command data. As discussed above, third-party speech recognition services may be utilized to provide speech recognition functionality/capabilities for a content provider. In such instances, the content provider may not have access to the underlying speech recognition software to calibrate the speech recognition system or to correct common/learned errors in recognizing commands spoken by a variety of different users. For example, a user may try to access or consume particular programming content, such as the television channel "Black Entertainment Television," which is often referred to in shorthand as "B.E.T." In several instances, the speech recognition system may incidentally recognize command data corresponding to a user speaking the phrase "B.E.T." as two separate phrases corresponding to "<unknown>"+"E.T." Although in many of these instances, the user may be attempting to watch programming content on the television channel "B.E.T.," because the speech recognition system may be consistently unable to recognize the first letter in the acronym, the speech recognition system may process a portion of the user command as "E.T.," which may correspond to other programming content (e.g., the movie "E.T.," the television show Entertainment Tonight, etc.). In this example, a synonym may be generated and/or stored in the entity database to overcome the recognition issues created by the speech recognition system. For instance, referring to FIG. 4, the synonym stored in the entity database 424 may be utilized to associate and/or weight command data recognized by the speech recognition system as "<unknown>+E.T." to correspond to "B.E.T," thus correcting the recognition issue at the natural language processing layer and not the speech recognition layer.

Synonyms may be generated and/or created in a variety of different manners without departing from the scope of the present disclosure. Synonyms may be created by the system utilizing supervised methods. The content service may utilize editors to annotate command data from a plurality of users. The editor may flag and/or input data into the system indicating various synonyms for certain words and phrases. As another example, the system may create a synonym in response to user reports (e.g., error reports) and/or user input indicating differences between an intended command and resulting command operations performed by the system. For example, if the user provides an audible command corresponding to "Harry Potter," but the system interprets the command as "Hairy Potter," in some instances, the user may have an opportunity to correct the interpreted command if (or when) the system prompts the user to confirm the spoken command. In this example, if the user amends the command to correspond to "Harry Potter," the system may transmit a communication (e.g., error report) indicating this amendments. In some instances, the system may create a synonym based on the differences and/or similarities between the two phrases.

In other embodiments, synonyms may be automatically and/or dynamically created by the system. The system may utilize an auto-correction module to provide real-time correction for certain entity or phrase types based on heuristic rules and other information, such as clickrank data. For instance, if the user provides an audible command corresponding to "Harry Potter," but the system interprets the command as "Hairy Potter," the user may have an opportunity to correct the interpreted command if (or when) the system prompts the user to confirm the spoken command. In this instance, the system may process clickrank data for a plurality of users to determine an excepted or intended phrase/entity provided by the user (e.g., "Harry Potter"), and may prompt the user to confirm the change. Additionally or alternatively, the system may utilize a machine-learning based language model to analyze a plurality of user sessions to identify rephrasing of spoken commands. The system may generate synonyms based on the rephrased commands. For example, if during a previous user session, the system rephrased the audible command of "Watch X Tant" to "Watch Extant," the system may create a synonym mapping the phrase "X Tant" to "Extant." In some instances, the system may prompt the user to confirm the creation and/or mapping for a synonym.

In yet another of these embodiments, the system may utilize a context sensitive machine learning models to identify and/or correct mistakes in transcriptions of command data to produce a correct or more appropriate acoustic transcription. The system may generate synonyms based on the correction of an acoustic transcript. For instance, when interpreting the audible command "Watch B.E.T. channel" the speech recognition module may interpret the command as "Watch E.T. channel." In this example, a synonym may be generated and/or stored in the entity database to overcome the recognition issues created by the speech recognition system. For instance, referring to FIG. 4, the synonym stored in the entity database 424 may be utilized to associate and/or weight command data recognized by the speech recognition system as "<unknown>+E.T." to correspond to "B.E.T," thus correcting the recognition issue at the natural language processing layer and not the speech recognition layer. Additionally or alternatively, the system may utilize a natural language phoneme model to identify and/or correct pronunciation errors for certain word/phrases comprising a spoken command, and may generate one or more synonyms based any corrections made by the system. For example, the system may create a synonym mapping the term "pixie" to "pixy" (or vice-a-versa) based on variances in a user's pronunciation of certain terms. The system may utilize a hybrid (or semi-supervised) method to identify and/or create synonyms. For example, the system may create one or more linguistic rules based on the above-discussed methods to automatically convert an incorrect acoustic transcription into an intended or desired transcription, and as such, the system may not store one-to-one mappings for each synonym to phrases/entities each time a user provides an audible command. For example, the system may be configured to try both "&" and "and" as replacements terms for each other when analyzing a user's audible command and/or when generating an acoustic transcription.

Referring back to FIG. 4, as depicted by element 404, the system may also utilize a second acoustic model (e.g., the acoustic model 418) to analyze and/or interpret each phrase comprising the audible command in accordance with a linguistic context of the acoustic model 418) (e.g., and acoustic model for native-Spanish speakers). Accordingly, the system may receive an audible command from the user corresponding to the spoken user command "Watch Nickelodeon," (e.g., element 401), and the system may utilize the acoustic model 418 to analyze the command data, generate an acoustic transcript in Spanish corresponding to the audible command, and to identify and/or extract phrases from the acoustic transcript. Similarly, as shown in FIG. 7, the phrase extractor 710 may analyze the acoustic transcript 705 to identify and/or extract each phrase comprising the spoken user command in accordance with a linguistic context of the acoustic model (e.g., the acoustic model 418) used to generate the transcript. Accordingly, the phrase extractor 710 may analyze the acoustic transcript 705 to identify and/or extract one or more phrases in Spanish.

In this example, the phrase extractor 710 may analyze a first portion of acoustic transcript 705 corresponding to the spoken user command "Watch" to identify the appropriate and corresponding Spanish phrase. As shown in the example depicted in FIG. 4, the system (e.g., speech recognition module) may be unable to identify a Spanish phrase corresponding to the spoken user command "Watch." In some embodiments, the system may provide an indication (e.g., visual indication, pop-up window, etc.) to the user that the system was unable to identify and/or interpret a portion of the command data. Additionally or alternatively, the system may insert a marker or some other suitable indicator within the acoustic transcript (e.g., the acoustic transcript 705) indicating that the system was unable to identify a Spanish word or phrase for a portion of the command data.

In some embodiments, the system may display on a display device one or more phrases identified by the phrase extractor 710 that match the command data and/or acoustic transcript. Referring to the example above, although the system may be unable to identify a Spanish phrase corresponding to the spoken user command "Watch," the system may present to the user a listing of Spanish phrases that match the spoken command. The system may prompt the user to indicate and/or confirm whether a portion of the audible command and/or acoustic transcript is identified within the listing of Spanish phrases displayed to the user. The system may retrieve a listing of phrases to be displayed to the user from a language database. Referring back to the example in FIG. 7, the phrase extractor 710 may then analyze a second portion of the acoustic transcript 705 corresponding to the spoken user command "Nickelodeon" to identify the appropriate and corresponding Spanish phrase. As noted above, in this example, the system has identified a Spanish phrase (i.e., "Meneca Lorient") as the Spanish word/phrase that best corresponds to the spoken user command, i.e., "Nickelodeon."

In some embodiments, the natural language processor may process and analyze input from a rules database (e.g., the rules database 422, 711), which may store various rules (e.g., heuristic rules) governing the interpretation of command data. In some embodiments, the system may determine which rules or groups of rules to utilize when interpreting command data based on the language spoken by the user and/or the acoustic models utilized to interpret the user's spoken commands. For example, if the system determines that a particular phrase/word was spoken in a first language (e.g., English), the natural language processor may retrieve (or utilize) rules from the rules database 422 associated with governing English words/phrases. In some embodiments, the system may utilize heuristic rules when a user command was spoken in multiple languages (e.g., Spanglish) and the system is distinguishing which identified words/phrases were spoken in a first language (e.g., English language) or another language (e.g., Spanish language).

As shown on FIG. 4, another example of a heuristic rule that may be stored in the rules database 422, would be that in instances where the system determines that the name of a programming network (e.g., HBO, Showtime, NBC, etc.) is detected within command data, the system may infer that the user intends to request a channel change (i.e., "If Network and Watch then action=Channel Name"). By identifying particular word(s)/phrase(s) within the spoken command of a user, the system may determine which set of heuristic rules should be utilized to determine (and/or identify) the remaining words/phrases comprising the command data.

Alternatively or additionally, when the system has identified, with a high level of confidence or certainty, one or more phrases/words of the command data in a first language, the identification of the one or more phrases/words may provide the system some guidance (via one or more heuristic rules) as to how the phrases/words of the command data should be interpreted for a second language. For instance, if the system identifies with a threshold confidence level (e.g., a 95% confidence level) that a "content entity" phrase in the command data is an English word, the system may infer that one or more of the remaining portions of the command data does not correspond to other "content entity" phrases in the English language. Instead, the system may emphasize its analysis and interpretation of the remaining portions of the command data by searching for a "content entity" phrase in Spanish and/or "action entity" phrases in either Spanish, English, or another language.

As an example, the system may receive command data corresponding to the spoken user command "Ver+Brad Pitt," and the system may analyze the command data using both an English-based acoustic model and a Spanish-based acoustic model to interpret the command data. When analyzing the second portion of the command data, the system may identify the phrases/words "Brad Pitt" in both the English-based acoustic transcript of the user's spoken command and a Spanish-based acoustic transcript. The system may also identify that the phrase/words "Brad Pitt" corresponds to a content entity phrase given that this particular word/phrase represents the name of an actor. Utilizing one or more heuristic rules, the system may subsequently infer with a high level of confidence that the detected actor's name corresponds to a word/phrase such that either the identified English phrase or the Spanish phrase may appropriately be utilized by the natural language processor to determine a desired/intended operational command. Alternatively or additionally, when the system identifies identical words/phrases in multiple languages, the system may select the word/phrase corresponding to the default language utilized by the system (e.g., English).

Referring back to the example above, when the system receives command data corresponding to the spoken user command "Ver+Brad Pitt," the system may analyze the first portion of the command data utilizing both a Spanish-based acoustic model and an English-based acoustic model to generate an acoustic transcript of the command data in both Spanish and English. When analyzing the Spanish-based acoustic model to generate an acoustic transcript of the command data in Spanish, the system may identify that the first portion of the command data best corresponds to the Spanish word/phrase "Ver." However, when analyzing the English-based acoustic model to generate an acoustic transcript of the command data in English, the system may identify that the first portion of the command data best corresponds to (or matches) the English word/phrase "Where." Utilizing one or more heuristic rules, the system may determine that the word/phrase "Ver" may best correspond to an intended "action entity" phrase and not the term "Where" since the term "Ver" more appropriately corresponds to the intended user command based on the system's previous interpretation of the content entity phrase "Brad Pitt" being either a Spanish phrase or an English phrase, and further, in view of the resulting phrase "Ver+Brad Pitt" fitting more appropriately within the context of an intended operational command for the computing device (e.g., the STB/DVR 113) than the alternative resulting phrase "Where+Brad Pitt."

Referring back to FIG. 3A, at step 313, the system may begin a loop that is performed for one or more of the phrases identified from the command data during step 311. In one embodiment, a natural language processing module, such as the NLP 420, may be configured to initiate a loop that is performed for one or more of the phrases identified and/or extracted during step 311. Additionally or alternatively, a computing device executing the natural language processing module may be configured to begin a loop that is performed for one or more of the phrases identified and/or extracted from the command data during step 311. In step 315, for each identified phrase analyzed within the loop, the system (and/or the natural language processing module) may begin to determine a relevancy ranking for the phrase being analyzed during step 313. As described above, the system may utilize a variety of parameters to rank phrases without departing from the scope of the present disclosure. For example, the system may rank (and/or re-rank) phrases based on synonyms used to map or amend phrases/entities comprising an audible command. As another example, the system may rank a phrase based on user input indicating a particular ranking for the phrase. The system may also rank (and/or modify a ranking) for a phrase based on the user's consumption history and/or previous audible commands. As yet another example, the system may rank (and/or modify a ranking) for a phrase based on a location of the user. In this example, the system may utilize the content consumption history for one or more users within a threshold proximity to the location of the user to rank and/or modify a ranking for a phrase. The system may also rank and/or modify a ranking for a phrase based on the availability of content items and/or whether the user has an entitlement to consume the content. For example, the system may provide a lower ranking for a phrase/entity corresponding to a content item that is on a channel or network that it not included in the user's content subscription. The system may utilize the above-discussed ranking techniques either alone, or in combination, to provide rankings for phrases/entities comprising an audible command. The system my dynamically adjust the relevance or use of one or more ranking techniques to maximize the ranking accuracy of the system and to minimize false positive results.

For example, referring back to FIG. 7, the phrase extractor 710 may transmit data to a phrase ranker module (e.g., the phrase ranker 720) indicating the various phrases identified and/or extracted from each acoustic transcript analyzed by the phrase extractor (e.g., the acoustic transcripts 701 and 705). The phrase ranker 720 may be configured to rank each of the phrases received from the phrase extractor 710. The phrase extractor 710 may transmit phrases identified in (and/or extracted from) each acoustic transcript for a variety of languages. Additionally or alternatively, the phrase ranker module may be configured to assign scores to each phrase indicating a respective relevancy ranking for the phrase.

In some embodiments, the phrase ranker 720 may utilize information from various input sources (e.g., the heuristic rules 721, the click rank database 722, etc.) to rank each of the phrases received from the phrase extractor 710. As discussed above, phrases can be ranked using a variety of different parameters, such as phrase length, string similarity, entity clickranks, promotional content, consumption history, and the like. The heuristic rules database 721 may store various rules governing the interpretation and ranking of phrases identified by the phrase extractor 720. In some embodiments, the system may determine which rules or groups of rules to use when interpreting extracted phrases based on the underlying language of the acoustic transcript from which the phrase was extracted. For example, if the system determines that a particular phrase/word was extracted from an English-based acoustic transcript, the natural language process or may retrieve (and/or utilize) rules from the heuristic rules database 721 associated with ranking English words and phrases. For instance, a first heuristic rule may cause the phrase ranker 720 to give higher priority to content with a larger "phrase length" than content with more "string similarity." As another example, a second heuristic rule may cause the phrase ranker 720 to give higher priority to "promotion content" than content with higher "click ranks." As yet another example, a third heuristic rule may cause the phrase ranker 720 to give higher priority to a manually added synonym than content with high "click ranks" and "sting similarity."

In some embodiments, a click-rank database (e.g., the click-rank database 722) may store click-rank data (and/or other suitable information indicating user viewing habits and selection history) that may be utilized by the system to identify previous user interactions with the entertainment system and/or content service (e.g., previous user content selections, times of day when the user utilizes the content service, etc.), as well content consumed by the user. The click-rank database may store click rank data for the user providing the audible command, as well as other users whose viewing and/or system interaction behavior is being monitored by the content service. The phrase ranker 720 may utilize the click rank data to analyze how other users have interacted with entertainment system (e.g., what operational commands were performed by the system) based on similar audible commands that were processed by the users' respective systems. Additionally or alternatively, the phrase ranker 720 may utilize the click rank data to analyze what content other users have requested based on similar audible commands that were processed by the users' respective systems.

The click rank database may store a log of a user's viewing behavior that is maintained by the user's respective entertainment system (e.g., the STB/DVR 113). In some instances the STB/DVR 113 (or any other suitable computing device operatively connected to the STB/DVR 113 for recording user viewing behavior) may record which content a user consumes and/or each viewing event associated with the user (e.g., each user click or selection via an electronic program guide or interface). By utilizing click rank data when identifying and ranking phrases, the phrase ranker 720 can more accurately determine the relevance of content entity phrases. For example, when ranking (and/or selecting between) two possible hypotheses for television shows that best correspond to (or match) a phrase within a spoken user command, the phrase ranker 720 may reference heuristic rules relating to the availability of the programming content (e.g., content items), such as which television show has a start time that is closest in proximity to the current time. However, if both potential television shows (e.g., content hypotheses) have the same start time, the system may then reference click-rank data to determine the likely relevance (or rankings) of the two television shows.

The phrase ranker 720 may determine what content the user (or other groups of users) have previously consumed, and use this information to determine a relative relevancy or confidence for the two hypotheses for potential television shows referenced in the user audible command by ranking each hypothesis based on previous user viewing habits. For example, the phrase ranker 720 may assign a higher ranking (and/or confidence level) to a first television show that was previously viewed by a higher number of users within a time period (e.g., the last month, the last year, on weekends, at night, etc.) as compared to a second (or other) television shows. As another example, the phrase ranker 720 may assign a higher ranking (and/or confidence level) to a first television show that was previously viewed by a larger population of users that have issued similar audible commands as compared to the second television show. By ranking the different content entity phrases supplied by the phrase extractor 710, phrase ranker may more accurately distinguish between potential content hypotheses based on determined probabilities and/or confidences. For example, content hypotheses that are assigned (or designated) as having a high threshold level of confidence (and/or probability of being accurate) may cause the entertainment system to automatically select the highly-ranked content item. The system may be further configured to automatically tune to a channel to begin displaying the identified content item. Additionally or alternatively, content hypotheses that are assigned (or designated) as having a low threshold level of confidence may cause the system to further supplement (and/or calibrate) rankings and hypothesis selections made available to the user. For example, the system may provide (via an application interface) to the user a listing of available choices (e.g., content hypotheses) as to which particular content item the user was referring to in their spoken command. User selections may be stored and/or utilized to calibrate data within the click-rank database and/or future confidence levels for programming content. Referring now to FIG. 3A, after determining relevancy rankings during step 315, the method may return to step 313 to continue the loop until all of the analyzed phrases have been processed, and when those phrases have been processed, the method may proceed to step 307. During step 307, the system may continue the loop until all of the acoustic models determined during step 305 have been analyzed, and when those acoustic models have been analyzed, the method may proceed to step 317. For example, rather than iteratively processing each identified acoustic model and each acted/identified phrase as described above with reference to steps 307-313, the system may be configured to simultaneously process command data across a plurality of acoustic models. In such embodiments, the system may identify/extract and rank a plurality of phrases comprising the acoustic transcripts that result from the command data being processed by one or more acoustic models determined during step 305.

At step 317, the system may determine/assign one or more action classifiers (e.g., phrase classifications) for the one or more phrases analyzed during step 313. A natural language processing module (e.g., the NLP 420) may determine/assign one or more action classifiers for the one or more phrases analyzed during step 313. The system may utilize action classifiers to categorize the various types of phrases/words that may be extracted from a spoken user command. For example, a first type of action classifier may comprise a content entity, which may represent one or more various types of content and/or content-related information that may be included in a user's spoken command. Various types of content and/or content-related information may be categorized as a content entity without departing from the scope of the present disclosure, such as the name of a content title, actor, sports team, network, and the like. As another example, a second type of action classifier utilized by the system may comprise an action entity, which may represent one or more types of actions and/or commands that a user may intend for a computing device (e.g., the STB/DVR 113, the display device 112) to implement, such as a device command. Various types of actions and/or operational commands may be categorized as an action entity without departing from the scope of the present disclosure, such as commands to modify volume, change a channel, power-off or power-on the entertainment system, watch a particular content item, retrieve information for a content item, and the like.

The system may require that command data corresponding to certain user commands comprise both a content entity and an action entity. For example, if the user provides a spoken command to a computing device (e.g., the STB/DVR 113) to change the current channel to a different channel, the system may analyze the one or more phrases in the command data (representing the user's spoken command) to determine which phrase(s) corresponds to an action entity (e.g., the command of changing the channel) and which phrase(s) corresponds to a content entity (e.g., the channel to which the device will subsequently tune). In this example, without the necessary content entity, the computing device would not be capable of performing the corresponding operational command. Additionally or alternatively, after identifying an action entity in the one or more phrases analyzed during step 313, the system may be configured to identify content entities in the one or more phrases extracted from the spoken user command.

Alternatively or additionally, after determining that a particular type of phrase classification or action classifier corresponds to one or more phrases comprising the user's spoken command, the system may assign the determined phrase classification(s) or action classifier(s) to the one or more phrases comprising the user's spoken command. The system may be configured to assign a phrase classification (or action classifier) to each phrase and/or a combination of phrases comprising the user's spoken command. The system may be further configured to generate a recognized pattern (and/or template) based on the one or more phrases comprising the user's spoken command, the corresponding action classifier types for the one or more phrases comprising the user's spoken command and corresponding operational commands that a user desires/intends a computing device to implement based on the spoken user command. Patterns generated by the system may be stored in a database (e.g., the patterns database 732) for subsequent retrieval and or reference by the system. The pattern database may comprise the various types of actions and operational commands that a user desires/intends the entertainment system to implement based on various combinations of action entities and content entities. Additionally or alternatively, the patterns stored in the pattern database may represent the operational commands that occur most frequently based on the user's previous spoken commands. The pattern database may rank the various patterns stored in the database based on a variety of factors (e.g., frequency) and heuristic rules, such that the system may more accurately determine intended operational commands for received command data based on the stored patterns.

For example, the system may generate a first pattern indicating that in the event the command data comprises both the action entity phrase "Watch" and a content entity phrase corresponding to a movie title, the system may instruct the STB/DVR 113 (or any other suitable computing device) to begin showing the movie on the display device 112. In this example, the system may flag this particular pattern (e.g., a combination of the action entity "Watch" and a movie title) and store the flagged pattern in the pattern database to be used by the system to better recognize/classify other user commands comprising similar action classifiers. As another example, the system may generate a second pattern indicating that in the event the command data comprises both the action entity phrase "Watch" and a content entity corresponding to the name of a sports team, the system may instruct the STB/DVR 113 to begin showing a sporting event feature the desired sports team. As yet another example, the system may generate a third pattern indicating that in the event the command data comprises both the action entity phrase "Watch" and a content entity corresponding to the name of a TV program, the system may instruct the STB/DVR 113 to tune to a channel playing the desired TV program.

In some embodiments, the system may calibrate or modify one or more generated patterns and/or patterns stored in the pattern database. Referring to the example above, if a user says "Watch Big Bang Theory," the system may utilize the third generated pattern to tune to a channel playing the show "Big Bang Theory." However, in the event that the TV show is not being currently shown on any television channels or networks, the system may calibrate the pattern to instruct the entertainment system to implement an alternative operational command. For example, the system may instruct the entertainment system to display an entity page for the TV program (i.e., the "Big Bang Theory" entity page), which may provide the user with various options relating to the TV program, such as options to record future episodes, access previous episodes of the program via video-on-demand services, and the like. In this example, the system may calibrate the generated pattern to first attempt to tune to a television channel showing the TV program, and if unavailable, to display an entity page for the TV program.

Additionally or alternatively, the system may calibrate the generated pattern based on the viewing habits of other users. Referring back to the example above, the system may modify the generated pattern to implement certain operational commands based on the type of operational commands that have been implemented when other users have provided similar commands to their respective. For example, the system may utilize access information stored in the click-rank database to determine what operational commands are implemented by user entertainment systems when the user requests to "Watch Big Bang Theory." The system may use this information to calibrate the pattern generated for the present user. In this example, the system may determine that typically when a user requests to watch "Big Bang Theory" in the morning, the TV show is not being shown on any television networks, and thus the user is presented with the "Big Bang Theory" entity page rather than tuning to the TV program. Accordingly, if the present user issues a command to "Watch Big Bang Theory" in the morning, the system may first attempt to show the user the "Big Bang Theory" entity page before attempting to tune to the TV program. The system may provide the user with an application interface that permits the user to manually calibrate one or more recognized patterns. The system may receive user input selections identifying an order of potential operational commands that may be associated with a particular pattern. The system may store the user input selections and utilize the user feedback to modify and/or calibrate patterns stored in the pattern database.

As shown in FIG. 7, the phrase ranker 720 may transmit data to action classifier module (e.g. the action classifier 730) indicating the respective rankings for various phrases identified and/or extracted from each acoustic transcript analyzed by the phrase extractor 710. The action classifier 730 may be configured to generate expected classifications for the various phrases that have been ranked by the phrase ranker 720. Additionally or alternatively, the action classifier 730 may be configured to generate an expected classification for a phrase based on whether the phrase corresponds to and/or is associated with a content entity (e.g., content title, television channel, sports team, etc.). The action classifier 730 may be further configured to recognize the particular type of content entity corresponding to and/or associated with a phrase, such as whether the phrase corresponds to a content title, whether the phrase corresponds to a television channel and the like. The action classifier 730 may be configured to specify, in a classification for a phrase, the particular type of content entity corresponding to and/or associated with the phrase. For example, the action classifier 730 may determine that a particular phrase corresponds to a content entity indicating a content title. The action classifier 730 may be further configured to generate an expected classification for a phrase based on whether the phrase corresponds to and/or is associated with an action entity and/or operational command (e.g., change channel, record, activate menu etc.). Like content entities, the action classifier 730 may be configured to recognize the particular type of action entity corresponding to and/or associated with a phrase.

The action classifier 730 may utilize information from various input sources (e.g., the heuristic rules 731, the pattern database 732, etc.) to classify each of the phrases. In some embodiments, the action classifier module may be configured to associate in a database (or other suitable form of data storage) each phrase with its corresponding classification. Referring back to the examples in FIGS. 4 and 7, the spoken user command corresponding to "Watch Nickelodeon" may be categorized by the system (e.g., the action classifier 730) as comprising both an action entity phrase and a content entity phrase. In this example, the phrase "Nickelodeon" corresponds to a content entity representing a particular programming network, and the phrase "Watch" corresponds to an action entity representing an operational command for a computing device (e.g., the STB/DVR 113). The action classifier 730 may retrieve a pattern (e.g., command pattern) from the pattern database 732 governing operational commands for the identified phrases and corresponding action classifiers (e.g., phrase classification). In this example, the system may identify a pattern corresponding to an operational command for a computing device (e.g., the STB/DVR 113) to tune to a channel corresponding to the television network Nickelodeon. The system may utilize the retrieved command patterns to map identified phrases for the purpose of resolving the action/intent underlying the user's spoken command. The system may generate and store a variety of command patterns in the pattern database 732 based on a history of commands spoken by a user, without departing from the scope of the present disclosure. For example, a first command pattern stored in the pattern database may comprise:

$$IF \begin{pmatrix} RECORD \\ \langle series \rangle \\ \langle channel \rangle \end{pmatrix} THEN \begin{pmatrix} action = RECORD \\ channel = \langle channel \rangle \\ title = \langle series \rangle \end{pmatrix}$$

In this example, the system may compare command data to a command pattern retrieved from the pattern database 732. If the system determines that the audible command comprises the phrase "RECORD" followed by two content entity phrases (i.e., "series" and "channel"), the system may be configured to correlate the spoken user command data to an operational command for the computing device (e.g., the STB/DVR 113) to record a content item corresponding to the identified "series" broadcasted on the identified "channel." In some instances, the system may compare a first phrase to a database of words or phrases to identify whether the first phrase corresponds to a particular type of content entity phrase, such as a movie title, a sports team, a channel, a series title, a genre, an asset type, and the like. As another example, a second command pattern stored in the pattern database may comprise:

$$IF \begin{pmatrix} GET \\ \langle genre \rangle \\ \langle assetType \rangle \end{pmatrix} THEN \begin{pmatrix} Action = BROWSE \\ genre = \langle genre \rangle \\ assetType = \langle assetType \rangle \end{pmatrix}$$

In the example above, if the system determines that the audible command comprises the phrase "GET" followed by two content entity phrases (i.e., "genre" and "asset type"), the system may be configured to correlate the spoken user command data to an operational command for the computing device (e.g., the STB/DVR 113) to browse a plurality of content items corresponding to the identified "genre" (e.g., horror, comedy, etc.) and "asset type" (e.g., movie, song, TV show, etc.). In this example, if the system determines that the command data corresponds to the phrase "Get+Horror+Movie," the system may identify and display in a user interface a plurality of content items corresponding to horror movies for the user the user to navigate. Similarly, if the system determines that the command data corresponds to the phrase "Get+Horror+Cowboys," the system may recognize that the term "Cowboys" does not correspond to an asset type, and as such, the phrase corresponding to the user's spoken command does not match the predefined syntax of the selected pattern. Accordingly, in some embodiments, the system may then attempt to identify retrieve a new pattern stored in the pattern database 732 to resolve the user's spoken command. Additionally or alternatively, the system may generate a new pattern based on the user's spoken command. The system may query the user to determine the particular operational command the user is attempting to perform. The system may associate the intended/targeted operational command with a new pattern, and store the pattern in the pattern database 732.

Referring to the example embodiment in FIG. 5, the English-based acoustic transcript associated with the command data (e.g., "Where+Unit Vision") may be analyzed by the system to determine the appropriate action classifiers. In this example, the system may be unable to identify action classifiers corresponding to the word/phrase "Unit Vision," but may identify the phrase "Where" as an action classifier. With respect to the Spanish-based acoustic transcript associated with the command data (e.g., "Ver Univision"), the system may analyze these words/phrases to determine the appropriate action classifiers. In this example, Spanish-based acoustic transcript may be categorized by the system as comprising both an action entity phrase and a content entity phrase. In this example, the phrase "Univision" corresponds to a content entity representing a particular programming network, and the phrase "Ver" corresponds to an action entity representing an operational command for a computing device (e.g., the STB/DVR 113). In this example, using the assigned phrase classifications for the phrases comprising the respective English-based and Spanish-based acoustic transcripts, the system may identify a pattern corresponding to an operational command for a computing device (e.g., the STB/DVR 113) to tune to a channel corresponding to the television network Univision.

Referring to the example embodiment in FIG. 6, the English-based acoustic transcript associated with the command data (e.g., "Watch+Ach Bay Oh") may be analyzed by the system to determine the appropriate action classifiers (e.g., phrase classifications). In this example, the English-based acoustic transcript may be categorized by the system as comprising at least an action entity phrase. In this example, the phrase "Ach Bay Oh" may be unrecognizable to the system, while the phrase "Watch" corresponds to an action entity representing an operational command for a computing device (e.g., the STB/DVR 113). The system may prompt the user to repeat the spoke command so that the system may attempt to recognize the unrecognizable phrase. The system may provide the user with a listing of the content entities and/or action entities that most closely match the unrecognizable phrase. With respect to the Spanish-based acoustic transcript associated with the command data (e.g., "<unrecognizable>+HBO"), the system may analyze these words/phrases to determine the appropriate action classifiers. In this example, Spanish-based acoustic transcript may be categorized by the system as comprising at least one content entity phrase. In this example, the phrase "HBO" corresponds to a content entity representing a particular programming network; however a first portion of the acoustic transcript is unrecognizable to the system. The system may prompt the user to repeat the spoke command so that the system may attempt to decipher the unrecognizable phrase. The system may provide the user with a listing of the content entities and/or action entities that most closely match the unrecognizable phrase.

Referring now FIG. 3B, after determining action classifiers during step 327, the method may proceed to step 321, where the system may determine one or more matches for the one or more phrases analyzed during step 313. Additionally or alternatively, the system may process the phrase rankings and/or action classifiers assigned to the one or more phrases analyzed during step 313 to determine a subset and/or combination of words/phrases that best represent the intended operational command desired by the user. The system may identify a subset or combination of words/phrases from one or more different acoustic models (and/or acoustic transcripts) when determining one or more match phrases. For instance, referring to the example in FIG. 6, the system may utilize the phrase "Watch" as determined by the English-based acoustic model 615 and the phrase "HBO" as determined by the Spanish-based acoustic model 618 when generating a match phrase corresponding to the spoken user command. This particular match phrase may correspond to an operational command (in Spanglish) to tune to the television network HBO.

Additionally or alternatively, multiple match phrases may be determined and subsequently considered by the system. Referring back to the example in FIG. 6, in the instance that the system is able to identify a content item corresponding to the phrase "Ach Bay Oh," such as the name of an actor, the system may determine a second match phrase by utilizing the phrases "Watch" and "Ach Bay Oh" as determined by English-based acoustic model 615. This particular match phrase may correspond to an operational command for the system to display the entity page for the actor Ach Bay Oh, which may provide the user with a listing of content items available for consumption that feature the actor Ach Bay Oh.

At step 323, the system may determine a response score for one or more of the match phrases determined during step 321. A response filter module (e.g., response filter 740) may be utilized to determine response scores for the match phrases determined during step 321. The response filter module may generate a response score for each command hypothesis (e.g., match phrase) that was determined by the system. The response filter module may be configured to utilize and/or combine other scores and information associated with the various match phrases during the previous actions/steps of the natural language processing algorithm depicted in FIG. 7. The response filter module may utilize the other scores (e.g., phrase rankings) and other information ascertained during the previous actions/steps of the natural language processing algorithm (e.g., action classifier information, generated/corresponding patterns, etc.) to determine a score (e.g., response score) for the match phrase.

After determining and/or retrieving a response score for the match phrase determined during step 323, the method may proceed to step 325, where the system may determine whether the response score for the match phrase analyzed during step 323 satisfies a threshold value. The system may determine whether a response score for each of the match phrase determined during step 321 satisfies a threshold value. The system may utilize a default threshold value set by the content provider. Additionally or alternatively, the user may determine (and/or modify) the threshold value via an application interface provided by the content or service provider. If the response score for a match phrase determined during step 323 does not satisfy the threshold value, the method proceed to step 328, where the system may discard the match phrase being analyzed during step 325. After the system discards the match phrase, the method may proceed to step 329. If the response score for a match phrase being analyzed during step 325 satisfies the threshold value, the method proceed to step 327, where the system may add the match phrase to a response array. The response array may comprise a list of NLP responses which have a confidence score satisfying a threshold value. The system may execute one or more responses in the array if subsequent modules within the system flag the response as usable/ appropriate. The responses included in the response array may represent just a possible intent of the user and in some instances, may not guarantee the execution of the user's intended operational command. As will be explained in more detail below, in some embodiments, other modules in the system may identify and/or populate the valid intents with more information such that a module in the system (e.g., the action response module 440) may correctly execute the user's audible command.

Referring back to the example embodiment in FIG. 6, the system may determine response scores for the two match phrases (e.g., command hypotheses) identified by the system. In this example, the system may determine/assign a first response score to the match phrase comprising the word "Watch" (as determined by the English-based acoustic model 615) and the word "HBO" (as determined by the Spanish-based acoustic model 618). The system may further determine/assign a second response score to the match phrase comprising the phrase "Watch+Ach Bay Oh" as determined by the English-based acoustic model 615. The system may then compare each of the first and second response scores to a threshold value to determine whether either match phrase may be discarded.

Referring now to FIG. 7, the action classifier 730 may be configured to transmit data to response filter module (e.g. the response filter 740) indicating the respective classification and/or corresponding characteristics assigned to various phrases identified and/or extracted from each acoustic transcript analyzed by the phrase extractor 710. The action classifier 730 may also transmit other scores (e.g., phrase rankings) and information ascertained during the previous actions/steps of the natural language processing (e.g., action classifier information, generated/corresponding patterns, etc.) to the response filter 740. As discussed above, the response filter 740 may utilize the information received from action classifier 730, as well heuristic rules retrieved from the heuristic rules database 741, to generate a response score for each match phrase. The response filter 740 may utilize rules retrieved from the database 741 to analyze and filter certain phrases from a "response array" if certain conditions are found to be true. Additionally or alternatively, the response filter 740 may filter out those phrases that do not satisfy a threshold confidence level.

The response filter 740 may process response scores for each match phrase to determine whether the response score for each match phrase satisfies a threshold value, and may further be configured to discard those match phrases having response scores that fail to satisfy the threshold value. For those match phrases that have response scores that satisfy the threshold value, the response filter 740 may store such match phrases to a database or other form of storage. The heuristic rules database 741 may include a plurality of rules and/or parameters governing the processing of response scores for the purpose of determining invalid hypotheses. For example, a first heuristic rule stored in the rules database 741 may comprise keeping received hypotheses above a first threshold level of confidence. Another heuristic rule stored in the rules database 741 may comprise keeping received hypotheses associated with promotional content. Yet another heuristic rule stored in the rules database 741 may comprise filtering out (or discarding) hypotheses associated with content items having adult-themed material. Still another heuristic rule stored in the rules database 741 may comprise filtering out (or discarding) hypotheses that do not satisfy the syntax of a pattern stored in the pattern database 732. A variety of heuristic rules may be stored in the rules database 741 without departing from the scope of the present disclosure.

In some embodiments, after filtering and/or processing the match phrases, the natural language processor (e.g., the NLP 420) may transmit the data indicating the results of the filtering process to another computing device and/or module. For example, as shown in FIG. 4, the NLP 420 may transmit output from the response filter 740 to the selector 430. In this example, the selector 430 may be configured to process content entities within one or more match phrases to determine whether the user is authorized to consume the corresponding programming content. The selector 430 may compare data indicating parental security settings of the entertainment system to the content entity contained in a match phrase. In this example, if the match phrase includes a content entity phrase corresponding to a movie having adult themes and/or an explicit content rating, the system may prevent the user from accessing the requested content. As another example, the selector 430 may compare data indicating a user's content subscription to the content entity contained in a match phrase. In this example, if the match phrase includes a content entity phrase corresponding to a television network that is not included in the user's content subscription, the system may prevent the user carrying out the desired operational command.

At step 329, the system may determine whether any additional match phrases identified and/or determined during step 321 are to be analyzed. As noted above, in some embodiments, the system may analyze each of the match phrases determined during step 321. If the system determines that an additional match phrase determined during step 321 may be analyzed, the method may proceed to step 323, where the system may determine a response scores for another match phrase determined during step 321. If the system determines that no additional match phrases may be analyzed, the method may proceed to step 331, where the system may determine an action response for a match phrase that was added to the response array during step 327. The system may determine an action response for a match phrase in the response array having the highest response score.

For example, referring to FIG. 4, action response module 440 may process output from selector 430 to determine an action response for one or more phrases processed by the NLP 420. In some embodiments, action response module 440 may process output from the NLP 420 to determine a first match phrase having a highest response score, and may then determine the appropriate action response for the first match phrase. The action response module 440 may transmit an instruction (or request) to a computing device, (e.g., the STB/DVR 411, the gateway device 111) to perform an operational command corresponding to at least one of the one or more phrases processed by the NLP 420, such as the match phrase having the highest response score. Additionally or alternatively, the action response module (or another suitable computing device) may be configured to utilize an application program interface (API) of a computing device (e.g., the STB/DVR 113, the gateway device 111, the application server 107) to perform the operational command corresponding to a match phrase determined by the system. An API request generated by the action response module may be configured to cause the API to instruct a computing device (e.g., the STB/DVR 411) to initiate/perform a variety of operational commands, such as retrieving programming content, displaying a particular menu/interface on a display device, changing a channel on a tuner (or other suitable computing device), and the like. The action response module may generate various types of request for the user based on the operational command corresponding to the match phrase without departing from the scope of the present disclosure, such as an Experience API (xAPI) request or other suitable API requests. The action response module may be configured to transmit the generated request/call to an appropriate computing device (e.g., the STB/DVR 113, the STB/DVR 411) to execute/perform the corresponding operational command.

The action response module may be configured to store the action response determined during step 331 in memory or some other suitable form of storage. Additionally or alternatively, the action response module may be configured to associate the determined action response with the corresponding match phrase in a database. The system may utilize a history of determined action responses and corresponding match phrases for user spoken commands to calibrate the speech recognition system and increase the accuracy of future action response determinations made for spoken user commands.

At step 335, the system may execute one or more operational commands corresponding to an action response and/or API request generated during step 331. As discussed above, the system may instruct a computing device (e.g., the STB/DVR 113) to execute one or more operational commands corresponding to the action response and/or API request determined during step 331. For example as depicted by element 408, in FIG. 4, the action response module 440 may transmit an API request/call to the xAPI 450 to cause an appropriate computing device (e.g., the STB/DVR 411) to execute a desired operational command. Although the example in FIG. 4 depicts an Experience API (e.g., the xAPI 450, 550, 650), any suitable application program interface may be utilized by the system to execute a desired operational command without departing from the scope of the present disclosure. As depicted by element 409 in FIG. 4, using the request/call transmitted from the action response module 440, the xAPI 450 may be configured to transmit a request/call to an appropriate computing device (e.g., (e.g., the STB/DVR 411) to perform the desired operational command, such as tuning to the STB/DVR 411 to a channel corresponding to the television network Nickelodeon.

In some embodiments, during step 335 the API (e.g., xAPI) may be configured to generate a runtime environment call to execute an operational command corresponding to the action response and/or API request determined during step 331. Referring to the example in FIG. 4, xAPI may generate a runtime environment call, such as a cross-platform runtime environment call (XRE), to the STB/DVR 411 to tune to a channel corresponding to the television network Nickelodeon. Referring now to FIG. 5, as another example, the action response module 540 may transmit an API request/call to the xAPI 550, which may then generate an XRE call to instruct the STB/DVR 511 to tune to a channel corresponding to the television network Univision. Referring now to FIG. 6, as yet another example, action response module 640 may transmit a request/call to the xAPI 650, which may then generate an XRE call to instruct the STB/DVR 611 to tune to a channel corresponding to the television network HBO. The request (e.g., API call) transmitted to the API (e.g., the xAPI 450) may require user authentication prior to the API generating an instruction, such as a runtime environment call, to the appropriate computing device for performing the desired operational command.

The foregoing description of embodiments has been presented for purposes of illustration and description. The foregoing description is not intended to be exhaustive or to limit embodiments to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present disclosure in various embodiments and with various modifications as are suited to the particular use contemplated. All embodiments need not necessarily achieve all objects or advantages identified above. Any and all permutations of various features described herein are within the scope of the present disclosure.

We claim:

1. A method comprising:
   receiving, from an input device, audio data corresponding to a multi-lingual user command;
   determining, by one or more processors, a plurality of acoustic models, wherein at least a first acoustic model of the plurality of acoustic models corresponds to a first language, and a second acoustic model of the plurality of acoustic models corresponds to a second language;
   generating, based on the audio data, a first transcript of the multi-lingual user command using the first acoustic model, and a second transcript of the multi-lingual user command using the second acoustic model;
   generating, from the first transcript, a first plurality of phrases corresponding to the first language;
   generating, from the second transcript, a second plurality of phrases corresponding to the second language;
   determining a phrase classifier for each phrase of the first plurality of phrases and the second plurality of phrases;
   determining, based at least in part on the determined phrase classifiers, one or more match phrases, wherein each match phrase comprises:
   one or more phrases of the first plurality of phrases corresponding to the first language; and
   one or more phrases of the second plurality of phrases corresponding to the second language; and
   sending, to a computing device and based on response scores for the one or more match phrases, an operational command.

2. The method of claim 1, wherein determining the plurality acoustic models further comprises:
   receiving user input indicating the first acoustic model.

3. The method of claim 1, wherein determining the plurality of acoustic models further comprises:
   receiving user input indicating the first language.

4. The method of claim 1, further comprising:
   comparing each phrase of the first plurality of phrases and the second plurality of phrases to one or more command patterns; and
   determining, based on the comparison of each phrase of the first plurality of phrases and the second plurality of phrases to the one or more command patterns, an operational command.

5. The method of claim 1, wherein determining the plurality of acoustic models further comprises:
   determining, based at least in part on one of a media content consumption history of a user or a location of the user, an acoustic model to process the audio data.

6. The method of claim 1, wherein the first acoustic model comprises a Spanish acoustic model, and the second acoustic model comprises an English acoustic model.

7. The method of claim 1, wherein determining the phrase classifier for each phrase of the first plurality of phrases and the second plurality of phrases further comprises:
   determining that a first phrase, of the first plurality of phrases, corresponds to a first type of phrase classifier; and
   determining a second type of phrase classifier for one or more remaining phrases of the first plurality of phrases.

8. The method of claim 7, wherein the first type of phrase classifier comprises an action entity indicating a device command.

9. The method of claim 1, wherein generating the first transcript of the multi-lingual user command using the first acoustic model further comprises:
   comparing a first portion of the audio data to a database of voice templates; and
   determining, based on the first acoustic model, a first voice template corresponding to the first portion of the audio data.

10. The method of claim 1, wherein sending the operational command further comprises:
    determining a response score for each match phrase of the one or more match phrases; and
    determining, based on the one or more response scores, a first match phrase; and
    sending, to the computing device, the operational command corresponding to the determined first match phrase.

11. A method comprising:
    receiving, from an input device, audio data corresponding to a multi-lingual user command;
    determining, by one or more processors, a plurality of acoustic models, each acoustic model corresponding to a different language;
    for each acoustic model of the plurality of acoustic models:
    generating, based on the audio data, a transcript; and
    generating, from the transcript, a plurality of phrases;
    determining one or more match phrases, wherein each match phrase comprises at least:
    one or more phrases of the plurality of phrases generated from a first acoustic model corresponding to a first language; and
    one or more phrases of the plurality of phrases generated from a second acoustic model corresponding to a second language;
    and
    sending, to a computing device and based on response scores for the one or more match phrases, an operational command.

12. The method of claim 11, wherein determining the one or more match phrases further comprises:
    determining a phrase classifier for each phrase of the plurality of generated phrases; and
    determining, based at least in part on the determined phrase classifiers, the one or more match phrases.

13. The method of claim 11, wherein determining the plurality of acoustic models further comprises:
    determining, based at least in part on one of a media content consumption history of a user or a location of the user, an acoustic model.

14. The method of claim 11, further comprising:
    comparing each phrase of the plurality of generated phrases to a first command pattern; and
    determining, based on the comparison of each phrase of the plurality of generated phrases to the first command pattern, an operational command.

15. The method of claim 14, wherein the first command pattern comprises a first content entity indicating a content item and a first action entity indicating a first device command, the method further comprising:
    determining that the content item is unavailable; and
    modifying the first command pattern to comprise a second action entity indicating a second device command.

16. The method of claim 11, wherein generating the transcript further comprises:
    comparing a first portion of the audio data to a database of voice templates; and
    determining, based on the first acoustic model, a first voice template corresponding to the first portion of the audio data.

17. The method of claim 16, further comprising:
receiving user input indicating the first acoustic model of the plurality of acoustic models.

18. A method comprising:
receiving, from a first computing device, audio data indicating a multi-lingual command;
generating, by one or more processors, a plurality of phrases corresponding to the multi-lingual command, wherein the plurality of phrases comprises one or more phrases corresponding to at least a first language and a second language;
for each phrase of the plurality of phrases: determining, for the phrase, at least one of an action classifier or an entity classifier;
determining, based on the determined classifiers, a plurality of match phrases, each match phrase corresponding to a prospective operational command,
determining a response score for each of the plurality of match phrases; and
sending, to a second computing device, a first operational command corresponding to a first match phrase satisfying a threshold score value.

19. The method of claim 18, further comprising:
determining, by the one or more processors, a ranking for each phrase of the plurality of generated phrases, wherein the at least one of the action classifier or the entity classifier is determined based on the determined ranking.

20. The method of claim 19, wherein determining the ranking for each phrase of the plurality of generated phrases further comprises:
determining, based at least in part on a media content consumption history of a first user, the ranking.

21. The method of claim 18, wherein determining the response score for each match phrase further comprises:
comparing each phrase, of the plurality of match phrases, to a first command pattern; and
determining, based on the comparison, the response score.

* * * * *